US010151829B2

(12) United States Patent
Lauenstein

(10) Patent No.: US 10,151,829 B2
(45) Date of Patent: Dec. 11, 2018

(54) SYSTEMS AND ASSOCIATED METHODS FOR PRODUCING SONAR IMAGE OVERLAY

(71) Applicant: NAVICO HOLDING AS, Egersund (NO)

(72) Inventor: Michael Lauenstein, Bayport, MN (US)

(73) Assignee: NAVICO HOLDING AS, Egersund (NO)

(*) Notice: Subject to any disclaimer, the term of this patent is extended or adjusted under 35 U.S.C. 154(b) by 376 days.

(21) Appl. No.: 15/050,724

(22) Filed: Feb. 23, 2016

(65) Prior Publication Data

US 2017/0242113 A1    Aug. 24, 2017

(51) Int. Cl.
| | |
|---|---|
| G01S 7/00 | (2006.01) |
| G01S 7/62 | (2006.01) |
| G01S 15/89 | (2006.01) |
| G01S 15/96 | (2006.01) |
| G01S 15/02 | (2006.01) |

(52) U.S. Cl.
CPC .......... *G01S 7/6281* (2013.01); *G01S 7/6272* (2013.01); *G01S 15/89* (2013.01); *G01S 15/96* (2013.01); *G01S 15/025* (2013.01); *G01S 15/8902* (2013.01)

(58) Field of Classification Search
CPC ........ G01S 7/6281; G01S 15/96; G01S 15/89; G01S 7/6272; G01S 15/8902; G01S 15/025
See application file for complete search history.

(56) References Cited

U.S. PATENT DOCUMENTS

| | | | |
|---|---|---|---|
| 1,667,540 A | 4/1928 | Dorsey | |
| 1,823,329 A | 9/1931 | Marrison | |
| 2,416,338 A | 2/1947 | Mason | |
| 3,005,973 A | 10/1961 | Kietz | |

(Continued)

FOREIGN PATENT DOCUMENTS

| | | |
|---|---|---|
| DE | 1 566 870 A1 | 4/1970 |
| DE | 35 16 698 A1 | 11/1986 |

(Continued)

OTHER PUBLICATIONS

UnderSee Explorer Shorelines; https://www.youtube.com/watch?v=Y7Ef-4T72oE; Mar. 31, 2011.

(Continued)

*Primary Examiner* — Hovhannes Baghdasaryan
(74) *Attorney, Agent, or Firm* — Nelson Mullins Riley & Scarborough LLP

(57) ABSTRACT

Overlaying a sonar image over a chart at a corresponding location can provide a beneficial and easy to understand view of the underwater environment for a user. However, in some cases, the watercraft may be close to a boundary of the body of water when the sonar data is gathered. In such a scenario, inaccurate sonar returns or preset display distances of the sonar image can cause the resulting sonar image to be displayed over the boundary and covering land. This can be confusing and can be difficult to decipher. Embodiments of the present invention provide systems and methods for cropping the sonar image for presentation over the chart such that no portion of the image extends beyond the boundary line of the body of water. This creates a smooth and easy to read sonar image/chart display.

20 Claims, 6 Drawing Sheets

(56) References Cited

U.S. PATENT DOCUMENTS

| | | |
|---|---|---|
| 3,090,030 A | 5/1963 | Schuck |
| 3,142,032 A | 7/1964 | Jones |
| 3,144,631 A | 8/1964 | Lustig et al. |
| 3,296,579 A | 1/1967 | Farr et al. |
| 3,304,532 A | 2/1967 | Nelkins et al. |
| 3,359,537 A | 12/1967 | Geil et al. |
| 3,381,264 A | 4/1968 | Lavergne et al. |
| 3,451,038 A | 6/1969 | Maass |
| 3,458,854 A | 7/1969 | Murphree |
| 3,484,737 A | 12/1969 | Walsh |
| 3,496,524 A | 2/1970 | Stavis et al. |
| 3,553,638 A | 1/1971 | Sublett |
| 3,585,578 A | 6/1971 | Fischer, Jr. et al. |
| 3,585,579 A | 6/1971 | Dorr et al. |
| 3,618,006 A | 11/1971 | Wright |
| 3,624,596 A | 11/1971 | Dickenson et al. |
| 3,716,824 A | 2/1973 | Door et al. |
| 3,742,436 A | 6/1973 | Jones |
| 3,757,287 A | 9/1973 | Bealor, Jr. |
| 3,781,775 A | 12/1973 | Malloy et al. |
| 3,895,339 A | 7/1975 | Jones et al. |
| 3,895,340 A | 7/1975 | Gilmour |
| 3,898,608 A | 8/1975 | Jones et al. |
| 3,907,239 A | 9/1975 | Ehrlich |
| 3,922,631 A | 11/1975 | Thompson et al. |
| 3,949,348 A | 4/1976 | Dorr |
| 3,950,723 A | 4/1976 | Gilmour |
| 3,953,828 A | 4/1976 | Cook |
| 3,964,424 A | 6/1976 | Hagemann |
| 3,967,234 A | 6/1976 | Jones |
| 3,975,704 A | 8/1976 | Klein |
| 4,030,096 A | 6/1977 | Stevens et al. |
| 4,047,148 A | 9/1977 | Hagemann |
| 4,052,693 A | 10/1977 | Gilmour |
| 4,063,212 A | 12/1977 | Sublett |
| 4,068,209 A | 1/1978 | Lagier |
| 4,075,599 A | 2/1978 | Kosalos et al. |
| 4,121,190 A | 10/1978 | Edgerton et al. |
| 4,184,210 A | 1/1980 | Hagemann |
| 4,197,591 A | 4/1980 | Hagemann |
| 4,198,702 A | 4/1980 | Clifford |
| 4,199,746 A | 4/1980 | Jones et al. |
| 4,200,922 A | 4/1980 | Hagemann |
| 4,204,281 A | 5/1980 | Hagemann |
| 4,207,620 A | 6/1980 | Morgera |
| 4,216,537 A | 8/1980 | Delignieres |
| 4,232,380 A | 11/1980 | Caron et al. |
| 4,347,591 A | 8/1982 | Stembridge et al. |
| RE31,026 E | 9/1982 | Shatto |
| 4,400,803 A | 8/1983 | Spiess et al. |
| 4,413,331 A | 11/1983 | Rowe, Jr. et al. |
| 4,493,064 A | 1/1985 | Odero et al. |
| 4,538,249 A | 8/1985 | Richard |
| 4,561,076 A | 12/1985 | Gritsch |
| 4,596,007 A | 6/1986 | Grail et al. |
| 4,635,240 A | 1/1987 | Geohegan, Jr. et al. |
| 4,641,290 A | 2/1987 | Massa et al. |
| 4,642,801 A | 2/1987 | Perny |
| 4,751,645 A | 6/1988 | Abrams et al. |
| 4,774,837 A | 10/1988 | Bird |
| 4,796,238 A | 1/1989 | Bourgeois et al. |
| 4,802,148 A | 1/1989 | Gilmour |
| 4,815,045 A | 3/1989 | Nakamura |
| 4,829,493 A | 5/1989 | Bailey |
| 4,855,961 A | 8/1989 | Jaffe et al. |
| 4,879,697 A | 11/1989 | Lowrance et al. |
| 4,907,208 A | 3/1990 | Lowarnce et al. |
| 4,912,685 A | 3/1990 | Gilmour |
| 4,924,448 A | 5/1990 | Gaer |
| 4,935,906 A | 6/1990 | Baker et al. |
| 4,939,700 A | 7/1990 | Breton |
| 4,958,330 A | 9/1990 | Higgins |
| 4,970,700 A | 11/1990 | Gilmour et al. |
| 4,972,387 A | 11/1990 | Warner |
| 4,975,887 A | 12/1990 | Maccabee et al. |
| 4,982,924 A | 1/1991 | Havins |
| 5,025,423 A | 6/1991 | Earp |
| 5,033,029 A | 7/1991 | Jones |
| 5,077,699 A | 12/1991 | Passamante et al. |
| 5,109,364 A | 4/1992 | Stiner |
| 5,113,377 A | 5/1992 | Johnson |
| 5,142,497 A | 8/1992 | Warrow |
| 5,142,502 A | 8/1992 | Wilcox et al. |
| D329,615 S | 9/1992 | Stiner |
| D329,616 S | 9/1992 | Stiner |
| 5,155,706 A | 10/1992 | Haley et al. |
| 5,182,732 A | 1/1993 | Pichowkin |
| 5,184,330 A | 2/1993 | Adams et al. |
| 5,191,341 A | 3/1993 | Gouard et al. |
| 5,200,931 A | 4/1993 | Kosalos et al. |
| 5,214,744 A | 5/1993 | Schweizer et al. |
| 5,231,609 A | 7/1993 | Gaer |
| 5,237,541 A | 8/1993 | Woodsum |
| 5,241,314 A | 8/1993 | Keeler et al. |
| 5,243,567 A | 9/1993 | Gingerich |
| 5,245,587 A | 9/1993 | Hutson |
| 5,257,241 A | 10/1993 | Henderson et al. |
| 5,260,912 A | 11/1993 | Latham |
| 5,276,453 A | 1/1994 | Heymsfield et al. |
| 5,297,109 A | 3/1994 | Barksdale, Jr. et al. |
| 5,299,173 A | 3/1994 | Ingram |
| 5,303,208 A | 4/1994 | Don |
| 5,376,933 A | 12/1994 | Tupper et al. |
| 5,390,152 A | 2/1995 | Boucher et al. |
| 5,412,618 A | 5/1995 | Gilmour |
| 5,433,202 A | 7/1995 | Mitchell et al. |
| 5,438,552 A | 8/1995 | Audi et al. |
| 5,442,358 A | 8/1995 | Keeler et al. |
| 5,455,806 A | 10/1995 | Hutson |
| 5,485,432 A | 1/1996 | Aechter et al. |
| 5,493,619 A | 2/1996 | Haley et al. |
| 5,515,337 A | 5/1996 | Gilmour et al. |
| 5,525,081 A | 6/1996 | Mardesich et al. |
| 5,537,366 A | 7/1996 | Gilmour |
| 5,537,380 A | 7/1996 | Sprankle, Jr. et al. |
| 5,546,356 A | 8/1996 | Zehner |
| 5,546,362 A | 8/1996 | Baumann et al. |
| 5,561,641 A | 10/1996 | Nishimori et al. |
| 5,574,700 A | 11/1996 | Chapman |
| 5,596,549 A | 1/1997 | Sheriff |
| 5,596,550 A | 1/1997 | Rowe, Jr. et al. |
| 5,602,801 A | 2/1997 | Nussbaum et al. |
| 5,612,928 A | 3/1997 | Haley et al. |
| 5,623,524 A | 4/1997 | Weiss et al. |
| 5,675,552 A | 10/1997 | Hicks et al. |
| 5,694,372 A | 12/1997 | Perennes |
| 5,790,474 A | 8/1998 | Feintuch |
| 5,805,525 A | 9/1998 | Sabol et al. |
| 5,805,528 A | 9/1998 | Hamada et al. |
| 5,808,967 A | 9/1998 | Yu et al. |
| 5,838,635 A | 11/1998 | Masreliez |
| 5,850,372 A | 12/1998 | Blue |
| 5,930,199 A | 7/1999 | Wilk |
| 5,991,239 A | 11/1999 | Fatemi-Booshehri et al. |
| 6,002,644 A | 12/1999 | Wilk |
| 6,084,827 A | 7/2000 | Johnson et al. |
| 6,130,641 A | 10/2000 | Kraeutner et al. |
| 6,215,730 B1 | 4/2001 | Pinto |
| 6,225,984 B1 | 5/2001 | Crawford |
| 6,226,227 B1 | 5/2001 | Lent et al. |
| 6,273,771 B1 | 8/2001 | Buckley et al. |
| 6,285,628 B1 | 9/2001 | Kiesel |
| 6,321,158 B1 | 11/2001 | DeLorme et al. |
| 6,325,020 B1 | 12/2001 | Guigne et al. |
| 6,335,905 B1 | 1/2002 | Kabel |
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |

(56) References Cited

U.S. PATENT DOCUMENTS

| | | |
|---|---|---|
| 6,738,311 B1 | 5/2004 | Guigne |
| 6,761,692 B2 | 7/2004 | Angelsen et al. |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,215,599 B2 | 5/2007 | Nishimori et al. |
| 7,236,426 B2 | 6/2007 | Turner et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 | 7/2008 | Skjold-Larsen |
| 7,430,461 B1 | 9/2008 | Michaels |
| 7,542,376 B1 | 6/2009 | Thompson et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,305,841 B2 | 11/2012 | Riordan et al. |
| 8,514,658 B2 | 8/2013 | Maguire |
| 8,605,550 B2 | 12/2013 | Maguire |
| 9,182,486 B2 | 11/2015 | Brown et al. |
| 2001/0026499 A1 | 10/2001 | Inouchi |
| 2002/0035574 A1 | 3/2002 | Dumas |
| 2002/0071029 A1 | 6/2002 | Zell et al. |
| 2002/0085452 A1 | 7/2002 | Scanlon |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1 | 9/2005 | Fisher et al. |
| 2006/0002232 A1 | 1/2006 | Shah et al. |
| 2006/0013066 A1 | 1/2006 | Nishimori et al. |
| 2006/0023570 A1 | 2/2006 | Betts et al. |
| 2006/0119585 A1 | 6/2006 | Skinner |
| 2006/0224940 A1 | 10/2006 | Lee |
| 2006/0276985 A1 | 12/2006 | Xu et al. |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0014386 A1 | 1/2010 | Thompson |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0007606 A1 | 1/2011 | Curtis |
| 2011/0012773 A1 | 1/2011 | Cunning et al. |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1 | 9/2011 | Soni et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0185801 A1 | 7/2012 | Madonna et al. |
| 2013/0007665 A1 | 1/2013 | Chaudhri et al. |
| 2013/0016588 A1 | 1/2013 | O'Dell |
| 2013/0208568 A1 | 8/2013 | Coleman |
| 2014/0010048 A1 | 1/2014 | Proctor |
| 2014/0064024 A1 | 3/2014 | Maguire |

FOREIGN PATENT DOCUMENTS

| | | |
|---|---|---|
| EP | 1 272 870 B1 | 4/2004 |
| EP | 1 393 025 B1 | 2/2006 |
| EP | 2 070 068 B1 | 3/2008 |
| EP | 2 023 159 A1 | 2/2009 |
| GB | 823304 A | 11/1959 |
| GB | 1 306 769 A | 2/1973 |
| GB | 1 315 651 A | 5/1973 |
| GB | 1 316 138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| GB | 2 444 161 A | 5/2008 |
| JP | 50-109389 U | 9/1975 |
| JP | 54-054365 U | 4/1979 |
| JP | 57-046173 A | 3/1982 |
| JP | 58-079178 A | 5/1983 |
| JP | S59-107285 A | 6/1984 |
| JP | S61-102574 A | 5/1986 |
| JP | 61-116678 A | 6/1986 |
| JP | S61-262674 A | 11/1986 |
| JP | 62-099877 U | 6/1987 |
| JP | 62-134084 U | 8/1987 |
| JP | 62-190480 A | 8/1987 |
| JP | 63-261181 A | 10/1988 |
| JP | H02-159591 A | 6/1990 |
| JP | H03-85476 A | 4/1991 |
| JP | 4357487 A | 12/1992 |
| JP | 7-031042 A | 1/1995 |
| JP | 07-270523 A | 10/1995 |
| JP | H10-123247 A | 5/1998 |
| JP | H10-132930 A | 5/1998 |
| JP | 10-186030 A | 7/1998 |
| JP | H10-325871 A | 12/1998 |
| JP | 2001-074840 A | 3/2001 |
| JP | 2002-168592 A | 6/2002 |
| JP | 2004-020276 A | 1/2004 |
| JP | 2004-219400 A | 8/2004 |
| JP | 2005-091307 A | 4/2005 |
| JP | 2006-064524 A | 3/2006 |
| JP | 2006-162480 A | 6/2006 |
| JP | 2006-208300 A | 8/2006 |
| JP | 2008-508539 | 3/2008 |
| JP | 2008-128900 A | 6/2008 |
| JP | 2009-222414 A | 10/2009 |
| JP | 2010-030340 A | 2/2010 |
| WO | WO 84/01833 A1 | 5/1984 |
| WO | WO 91/02989 A1 | 3/1991 |
| WO | WO 98/15846 | 4/1998 |
| WO | WO 03/009276 A2 | 1/2003 |
| WO | WO 2005/057234 A1 | 6/2005 |

(56) References Cited

FOREIGN PATENT DOCUMENTS

| WO | WO 2008/105932 A2 | 9/2008 |
|---|---|---|
| WO | WO 2008/152618 A1 | 12/2008 |
| WO | WO 2011/008429 A1 | 1/2011 |

OTHER PUBLICATIONS

Humminbird; Installation and Operations Manual; 900 Series; pp. 1-133.
Garment; Garmin Quickdraw™ Contours, retrieved Jan. 31, 2018; https://buy.garmin.com/en-US/US/p/543340#overview; date unknown; 5 pages.
Johnson Outdoors; Humminbird; AutoChart Live; retrieved Jan. 31, 2018; <https://www.humminbird.com/category/technology/autochart-live/>; date unknown; 8 pages.
"100 W adjustable Wide-Beam: Transom-Mount Transducer-P48W;" Airmar Technology Corporation.
"100 W adjustable Wide-Beam: Transom-Mount Transducer-P48W;" Airmar Technology Corporation; <www.airmar.com>.
"ITC Application Equations for Underwater Sound Transducers"; Published by International Transducer Corporation, 1995, Rev. 8/00; 3 pages.
"Product Survey Side-Scan Sonar"; Hydro International Magazine; vol. 36; Apr. 2004; pp. 36-39.
"Transducers Quad Beam," Prior to Aug. 2, 2003.
Airman Press Release: Airman Introduces P48W 200kHz Adjustable, Wide-Beam, Transom-Mount: Industry's widest 200 kHz transducer can help win fishing tournaments (Apr. 23, 2009).
Airman Technology Corporation Brochure/Presentation: Guide to Transducer Technology (Aug. 18, 2010).
Airman Technology Corporation Datasheet: P48W Transom-Mount Adjustable Wide-Beam, (Dec. 2010).
Airman Technology Corporation, R209 Dual Frequency 2 to 3W Transducer; Oct. 10, 2007; 2 pages.
Airman Technology Corporation, R99 Dual Frequency 2kW Transducer; May 2, 2006; 2 pages.
Airmar Technology Corporation Brochure DST800 Retractable Transducer System Sep. 2005.
Alpine Geophysical Data Programmer Model 485C Brochure and letter dated Feb. 17, 1976; 2 pages.
Anderson, K.; "Side-Scanning for Sport Fishing"; Salt Water Sportsman; Apr. 1, 2009; 4 pages.
Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.
Armstrong, A.A., et al.; "New Technology for Shallow Water Hydrographic Surveys"; Proceedings of the 25th Joint Meeting of UJNR Sea-bottom Surveys Panel; Dec. 1996.
Asplin, R.G., et al.; "A new Generation Side Scan Sonar"; OCEANS '88 Proceedings. 'A Partnership of Marine Interests'; vol. 2; Oct.-Nov. 1988; pp. 329-334.
Australian Government, Department of Sustainability, Environment, Water, Population and Communities; Fact Sheet—The RV Tangaroa; dated unknown; 3 pages.
Avera W., et al., Multibeam Bathymetry from a Mine-Hunting Military Sonar, Report No. NRL/JA/7440-02-1010, Naval Research Laboratory and Naval Oceanographic Office, (Nov. 2002).
Baker, N., et al, "Rifting History of the Northern Mariana Trough: SeaMARCH II and Seismic Reflection Surveys," Journals of Geophysical Research, vol. 101, No. B5, May 10, 1996.
Ballantyne, J.; "Find and Catch Fish, Quickly and Easily, with the FISHIN' BUDDY 2255"; [Online]; [Retrieved on Dec. 7, 2011]; <URL:http://www.articleslash.net/Recreation-and-Sports/Fishing/67018-Find-and-Catch-More-Fish-Quickly-and-Easily-with-the-FISHIN-BUDDY-2255.html>; 4 pages.
Barbu, C., et al., AQS-20 Sonar Processing Enhancement for Bathymetry Estimation, pp. 1-5, Presented at OCEANS Conference (2005).
Barbu, Madalina, "Acoustic Seabed and Target Classification using Fractional Fourier Transform and Time-Frequency Transform Techniques" Dissertation Paper 480, University of New Orleans (2006).
Barnum, S.R. CDR, Descriptive Report to Accompany Hydrographic Survey Side, Scan Sonar / Multibeam Survey of Portsmouth Harbor, Survey No. H11014 (2001).
Bass, G. New Tools for Undersea Archeology, National Geographic, vol. 134, pp. 403-422 (1968).
Benthien, George W, and Hobbs, Stephen, Technical Report: Modeling of Sonar Transducers and Arrays, Sep. 2005.
Benthos C3D Sonar Imaging System; "High Resolution Side with Bathymetry"; Benthos, Inc.; © May 2002.
Berktay, H. O., et al.; "Farfield performance of parametric transmitter;" Journal of Acoustical Society of America, vol. 55, No. 3; dated Mar. 1974.
Blondel, Philippe; The Handbook of Sidescan Sonar; © 2009; 316 pages.
Buchanan, H.L. and Lt. Cmdr. John M. Cottingham, Countering Mines in 2005, Sea Technology, vol. 41, No. 1, pp. 24-29, (Jan. 2000).
Calcutt, Ron; Lowrance Book of Sonar & GPS; © 1986; and Lowrance Book of Sonar & GPS Update; 1997; collectively 122 pages.
Carey, W.M., "Sonar Array Characterization, Experimental Results"; IEEE Journal of Oceanic Engineering ; vol. 23; Issue 3; Jul. 1998; pp. 297-306.
Chesterman, W.D., Clynick, P.R., and Stride, A.H., An Acoustic Aid to Sea Bed Survey, Acustica, pp. 285-290, Apr. 1958.
Clausner, J. Coastal Engineering Technical Note: Side Scan Sonar for Inspecting Coastal Structures, CETN-III-16, U.S. Army Engineer Waterways Experiment Station, (Nov. 1983).
Clausner, J.E. and Pope, J., 1988. "Side-scan sonar applications for evaluating coastal structures"; U.S. Army Corps of Engineers, Technical Report CERC-88-16; 80 pages.
Coastal Engineering Technical Note; "Side-Scan Sonar for Inspecting Coastal Structures"; U.S. Army Engineer Waterways Experiment Station; Revised Nov. 1983.
Communication [extended European Search Report] for European Application No. 5782717.2-2220 dated Aug. 31, 2011; 12 pages.
Communication for European Patent Application No. 05782717.2-2220 dated May 11, 2012; 9 pages.
ConCAT Containerised Catamaran; Inshore hydrographic survey vessel that fits in a container; In Cooperation with Uniteam International; Kongsberg Simrad AS; Apr. 2004.
Cowie, P.A., et al., "Quantitative Fault Studies on the East Pacific Rise: A Comparison of Sonar Imaging Techniques," Journal of Geophysical Research, vol. 99, B8, Aug. 10, 1994.
Craig, J.D., Engineering and Design: Evaluation and Repair of Concrete Structures, Manual No. 1110-2-2002, US Army Corps of Engineers, Department of the Army (Jun. 1995).
Curcio, J., et al.; "SCOUT—A Low Cost Autonomous Surface Platfom for Research Cooperative Autonomy"; Department of Mechanical Engineering; Massachusetts Institute of Technology; Aug. 2005.
Cyr, Reginald, A Review of Obstacle Avoidance/Search Sonars Suitable for Submersible Applications, Marine Tech. Soc. Journal., vol. 20, No. 4, pp. 47-57(Dec. 1986).
Datasheet / Specification for Imagenex Sportscan, (Aug. 2005).
Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.
De Jong, C. D., et al.; "Hydrography: Series on Mathematical Geodesy and Positioning;" VSSD; ISBN 90-407-2359-1; dated 2002.
Decision for Inter Partes Review of U.S. Pat. No. 8,305,840; IPR2013-00355; dated Dec. 12, 2013; United States Patent and Trademark Office; 36 pages.
Decision for Inter Partes Review of U.S. Pat. No. 8,305,840; IPR2013-00496; dated Feb. 11, 2014; United States Patent and Trademark Office; 14 pages.
Decision for Inter Partes Review of U.S. Pat. No. 8,305,840; IPR2013-00497; dated Feb. 11, 2014; United States Patent and Trademark Office; 17 pages.

(56) References Cited

OTHER PUBLICATIONS

Declaration of Paul Stokes for Inter Partes Review of U.S. Pat. No. 8,305,840;IPR2013-00496; dated Aug. 2, 2013; Raymarine, Inc.; 124 pages.
Declaration of Paul Stokes for Inter Partes Review of U.S. Pat. No. 8,305,840; IPR2013-00355; dated Jun. 12, 2013; Raymarine, Inc.; 118 pages.
Declaration of Paul Stokes for Inter Partes Review of U.S. Pat. No. 8,305,840; IPR2013-00497; dated Aug. 2, 2013; Raymarine, Inc.; 166 pages.
Deep Vision Side Scan Sonar Systems; [Online]; [Retrieved on Dec. 2, 2011]; Retrieved from the Internet <URL:http://www.deepvision.se/products.htm>; 5 pages.
Denny, M., Blip, Ping, and Buzz, JHU Press 1st ed. (2007).
DeRoos, Bradley G. et al., Technical Survey and Evaluation of Underwater Sensors and Remotely Operated Vehicles; May 1993; 324 pages.
Derrow, II, Robert W. et al., A Narrow-Beam, Side-Looking Sonar for Observing and Counting Fish in Shallow Aquaculture Ponds; 1996; 34 pages.
Detailed Sonar Transducer Product Information; Transducer Products; Side Scans; Models T36, T63, T62, and T403; Dec. 30, 2003; Retrieved from internet: URL:http://www.neptune-sonar.com/products.as-btype=Side-Scan+Transducers&category=; 4 pages.
Donovan, D.T., Stride, A.H., and Lloyd, A.J., An Acoustic Survey of the Sea Floor South of Dorset and its Geological Interpretation, Philosophical Transactions of the Royal Society of London, Series B, Biological Sciences, pp. 299-330 (Nov. 1961).
DSME E&R Ltd.; Remotely Operated Sonar Boat System (SB-100S); http://dsmeu.en.ec21.com/Remotely-Operated-Sonar-Boat-System-618904-2479905.html; printed on Feb. 12, 2010;3 pages.
EA 400/600 Sidescan: Echo Sounder with Combined Sidescan and Depth Soundings, Konigsberg Maritime AS, (Nov. 2005).
Eagle Electronics; Ultra 3D Installation and Operation Manual; © 2002; 24 pages.
EdgeTech 2000-CSS Integrated Coastal System Subscan Brochure (date unknown).
EDO Corporation Global Technology Reach, Model 6400 Fan Beam Transducer; http:/web/archive/org/web/20040608054923/www.edoceramic.con/NavDucers.htm; Jun. 3, 2004.
Elmore, P.A. et al., Use of the AN/AQS-20A Tactical Mine-hunting Sysmtem for on-scene Bathymetry Data, Journal of Marine Systems, vol 78, pp. 5425-5432(Feb. 2008).
Elmore, P.A., et al., Environmental Measurements Derived from Tactical Mine Hunting Sonar Data, pp. 1-5, Presented at OCEANS Conference (2007).
EM1110-2-1003;, Department of the Army; U.S. Army Corps of Engineers; Engineering and Design; Hydrographic Surveying; Apr. 1, 2004.
Extended European Search Report for Application No. 13153403.4; dated May 7, 2013.
Farrell, E.J.; , "Color Display and Interactive Interpretation of Three-Dimensional Data"; IBM Journal of Research and Development; vol. 27; No. 4; Jul. 1983; pp. 356-366.
Feature Matrix-SonarTRX/-Si/-LSS Sidescan sonar processing software (Version 13.1—Feb. 20, 2013) [retrieved Feb. 10, 2015]. Retrieved from the Internet: http://www.sonartrx.com/Documents/SonarTRX-FeatureMatrix-1301.pdf (dated Feb. 10, 2015), 2 pages.
Provisional U.S. Appl. No. 60/552,769, filed Mar. 12, 2004; Applicant: Terrence Schroeder.
Final Report; Early Implementation of Nearshore Ecosystem Database Project Tasks 2 and 3; [online]; Retrieved on Feb. 26, 2010 from the Internet <URL: http://seafloor.csumb.edu/taskforce/html%202%20web/finalreport.htm; 90 pages.
FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.
Fishin' Buddy 4200™ Operations Manual; dated Dec. 21, 2005; 16 pages.
Fishing Tool Reviews—Bottom Line Fishin Buddy 1200 Fishfmder; [Online]; [Retrieved on Dec. 7, 2011]; Retrieved from the Internet <URL:http://www.tackletour.com/reviewbottomline1200.html>; 4 pages.
Flemming, B.W., Side-Scan Sonar: A Practical Guide, International Hydrographic, pp. 65-92 (Jan. 1976).
Flemming, B.W., M. Klein, P.M. Denbigh, Recent Developments in Side Scan Sonar Techniques, (1982).
Fried, N. W.; "An Investigation of a Large Step-Down Ratio Parametric Sonar and Its Use in Sub-Bottom Profiling;" Thesis: Simon Fraser University; dated Aug. 1992.
Furuno Electric Co., Ltd.; Side Looking Sonar, Model SL-16, 1983; 4 pages.
Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).
Garmin GPSMAN 3206/3210 Color Chartplotter Owner's Manual (Jun. 2006).
Garmin; GPSMAN® 4000/5000 Series, Owner's Manual; 2007; 54 pages.
GeoAcoustics, GeoSwath Operation Manual Swath 6100/B (Sep. 1998).
GeoAcoustics, GeoSwath Product Bulletin (2000).
GeoAcoustics; A Kongsberg Company; GeoSwath Plus Brochure; "Wide swath bathymetry and georeferenced side scan"; [Online]; Retrieved from the internet < URL: http://www.km.kongsberg.com/ks/web/nokbg0397.nsf/AllWeb/F4B7FD3461368388C1257599002D34BC/$file/GeoSwath-Plus-brochure.pdf?OpenElement.
Geoacoustics; GeoPulse, Profiler System; Feb. 2006, 2 pages.
GeoPulse; GeoAcoustics Pinger Sub-Bottom Profiler; Retrieved from the Internet <URL: http://www.km.kongsberg.com/ks/web/nokbg0397.nsf/AllWeb/D1084BB7DD0FD2IDC12574C0003E01EA/$file/GeoPulse-Profiler.pdf?OpenElement; GeoAcoustics Limited, UK; A Kongsberg Company.
GlobalMap Sport; Installation and Operation Instructions; Lowrance Electronics, Inc.; © 1996; 61 pages.
Glynn, Jr., J.M., et al.; "Survey Operations and Results Using a Klein 5410 Bathymetric Sidescan Sonar"; Retrieved from the Internet <URL: http://www.thsoa.org/hy07/03-04.pdf; Mar. 2007.
Google http://wayback.archive.org/web/20100425042606/http://computer.howstuffworks.com/internet/basics/google-earth7.htm, Mar. 25, 2010 , pp. 1-2.
GPS Speed Correction; Sidescan Sonar; [online]; Retrieved from the Internet URL: <www.hydrakula.uni-kiel.de/downloads/Sidescan%20Sonar.doc; 10 pages.
Hansen, H.H.; "Circular vs. rectangular transducers"; Department of Electronics and Telecommunications; Norwegian University of Science and Technology; Mar. 2010; 28 pages.
Hansen, R.E., Introduction to Sonar, Course Material to INF-GEO4310, University of Oslo, (Oct. 7, 2009).
Hardiman, J. E., et al.; "High Repetition Rate Side Looking Sonar;" Oceans 2002 MTSIEEE, vol. 4; dated Oct. 2002.
Hare, M.R., "Small-Boat Surveys in Shallow Water", 2008 Institute of Ocean Sciences, Marine habitat mapping Technology for Alaska; 19 pages.
Harris, M.M., et al., Tow Vehicle Depth Verification, Oceans 2002 IEEE/MTS Conference Proceedings, pp. 1199-1202 (Oct. 2002).
Hayes, M.P. and Ho, T.Y., 2000. "Height estimation of a sonar towfish from sidescan imagery", Hamilton: Proc. Image Vision Computing New Zealand; 6 pages.
Hemming, B.W., M. Klein, P.M. Denbigh, Recent Developments in Side Scan Sonar Techniques, (1982).
Hersey, J. B, et al., Sonar Uses in Oceanography, Presented at Instrument Automation Conference and Exhibit, New York, NY, Sep. 1960.
Hogarth, P., Low Cost Swath Bathymetry: Widening the swath bathymetry market, Hydro International (Jul. 2000).
Hughes Clarke, J. E., et al.; Knudsen 320 200 kHz keel-mounted sidescan trials; Results from 2000/2001/2002 field operations; [online]; Retrieved on Jun. 23, 2010, from the Internet <URL: http://www.omg.unb.ca/Ksidescan/K320-SStrials.html; 11 pages.

(56) References Cited

OTHER PUBLICATIONS

Hughes Clarke, J.E.; "Seafloor characterization using keel-mounted sidescan: proper compensation for radiometric and geometric distortion"; Canadian Hydrographic Conference; May 2004; 18 pages.
Humminbird "Matrix 35 Fishing System," Prior to Aug. 2, 2003.
Humminbird "Matrix 97 GPS Trackplotter Operations Manual" 2003.
Humminbird "The Product Line>Matrix Products>Matrix 35" http://web.archive.org/web/20030404000447/www.humminbird.com/hb-Products.asp?ID, Apr. 4, 2003
Humminbird "Wideside"; Schematic; Dec. 15, 1994; 5 pages.
Humminbird 100 Series™ Fishin' Buddy®; 110, 120, 130 and 140c Product Manual; © 2007; 2 pages.
Humminbird 1100 Series Operations Manual; © 2007; 196 pages.
Humminbird 1197c Operations Manual; Nov. 6, 2007; 196 pages.
Humminbird 1198C Review for Catfishing, Catfishing "How to" Catfishing Techniques, Oct. 31, 2011, 9 pages.
Humminbird 200DX Dual Beam Operations Manual; 43 pages.
Humminbird 500 Series; 550, 560, 570 and 570 DI Operations Manual; © 2010; 84 pages.
Humminbird 757c, 787c2 and 757c2i CPS Chartplotter Operations Manual 2006; 161 pages.
Humminbird 997c SI Combo Installation and Operations Manual 2008; 151 pages.
Humminbird Dimension 3 Sonar 600 Operations Manual; 24 pages.
Humminbird GPS NS 10 Operations Manual; 75 pages.
Humminbird High Speed Transducer; 4 pages.
Humminbird LCR 400 ID Operations Manual; 28 pages.
Humminbird Marine Information Systems; Dimension 3 Sonar™; 1992; 16 pages.
Humminbird Matrix 35 Fishing System; 2 pages.
Humminbird Matrix 55 and 65 Operations Manual; © 2003; 40 pages.
Humminbird Matrix 67 GPS Trackplotter Operations Manual; © 2003; 88 pages.
Humminbird Matrix 97 Operations Manual; © 2003; 87 pages.
Humminbird Matrix™ 87c Operations Manual; © 2004; 45 pages.
Humminbird NS25 Operations Manual; 71 pages.
Humminbird Piranha 1 & 2 Operation Guide; 5 pages.
Humminbird Platinum ID 120 Operations Manual; 36 pages.
Humminbird Platinum ID 600 Operations Manual; 18 pages.
Humminbird The New Wave of Wide; 1997; Humminbird Wide®; fish wide open!®; 24 pages.
Humminbird Wide 3D Paramount Operations Manual; 44 pages.
Humminbird Wide 3D View Operations Manual; 38 pages.
Humminbird Wide 3D Vision Operations Manuals; 38 pages.
Humminbird Wide 3D Vista Operations Manual; 38 pages.
Humminbird Wide Brochure 1997; fish wide open!; 4 pages.
Humminbird Wide Eye Operations Manual; 32 pages.
Humminbird Wide Optic Operations Manual 1997; fish wide open!: 32 pages.
Humminbird Wide Paramount Operations Manual; fish wide open!; 32 pages.
Humminbird: America's favorite Fishfinder—the leading innovator of Side Imaging technology; [Online]; [Retrieved on Mar. 16, 2011]; Retrieved from the Internet <URL: http://www.humminbird.com/support/ProductManuals.aspx>; 20 pages.
Humminbird® Trolling Motor Mounted Transducer with Mount Assembly Brochure; © 2008 Humminbird®, Eufaula, AL; 2 pages.
Hussong, D.M., et al., "High-Resolution Acoustic Seafloor Mapping," 20th Annual OTC, Houston, TX, May 2-5, 1988.
Hydro Products; A Tetra Tech Company; 4000 Series Gifft Precision Depth Recorder Product Brochure; date stamped 1977.
Hydro Surveys: Side Scan Sonar Systems, Hydro International (2008).
HyPack Inc,: HyPack Software User Manual (date unknown).
Imagenex (Various) Technical Specifications and User's Manual; Prior to Aug. 2003.
Imagenex Model 855 Brochure: Online; Documents retrieved from internet web archives as follows: URL:http://web.archive.org/web/20021023212210/http:/www.imagenex.com/Products/855_858/855_858.html; 1 page; Archived on Oct. 23, 2002 URL:http://web.archive.org/web/20021024124035/http:/www.imagenex.com/Products/855_858/855/855.html; 1 page; Archived on Oct. 24, 2002 URL:http://web.archive.org/web/20021024125254/http:/www.imagenex.com/Products/855_858/858/858.html; 1 page; Archived on Oct. 24, 2002 URL:http://web.archive.org/web/20030424071306/http:/www.imagenex.com//855_Page_1.jpg; 1 page; Archived on Apr. 24, 2003 URL:http://web.archive.org/web/20030424091547/http:/www.imagenex.com/855_Page_2.jpg; 1 page; Archived on Apr. 24, 2003 URL:http://web.archive.org/web/20030424094158/http:/www.imagenex.com/855_Page_3.jpg; 1 page; Archived on Apr. 24, 2003 URL:http://web.archive.org/web/20030424101301/http:/www.imagenex.com/855_Page_4.jpg; 1 page; Archived on Apr. 24, 2003 URL:http://web.archive.org/web/20030424101939/http:/www.imagenex.com/855_Page_5.jpg; 1 page; Archived on Apr. 24, 2003 URL:http://web.archive.org/web/20030424135458/http:/www.imagenex.com/855_Page_6.jpg; Archived on Apr. 24, 2003 URL:http://web.archive.org/web/20030424141232/http:/www.imagenex.com/855_Page_7.jpg; 1 page; Archived on Apr. 24, 2003 URL:http://web.archive.org/web/20030424143158/http:/www.imagenex.com/855_Page_8.jpg; 1 page; Archived on Apr. 24, 2003.
Imagenex Model 855 User's Manual (Nov. 1991).
Imagenex Model 858 User's Manual (May 1999).
Imagenex Model 872 "Yellowfin" Sidescan Sonar; Imagenex Technology Corp.; © 2004-2009.
Imagenex SportScan Digital SideScan Sonar Brochure: Online; Documents retrieved from internet web archives as follows: URL:http://web.archive.org/web/20030212030409/http://www.imagenex.com/Products/products.html; 1 page; Archived on Feb. 12, 2003 URL:http://web.archive.org/web/20030214044915/http://www.imagenex.com/Products/SportScan/sportscan.html; 1 page; Archived on Feb. 14, 2003 URL:http://web.archive.org/web/20030222152337/http://www.imagenex.com/Products/SportScan/SportScan-Specs/sportscan-specs.html; 3 pages; Archived on Feb. 22, 2003 URL:http://web.archive.org/web/20030222161450/http://www.imagenex.com/Products/SportScan/FAQ-s/faq-s.html; 4 pages; Archived on Feb. 22, 2003 URL:http://web.archive.org/web/20030419024526/http://www.imagenex.com/Products/SportScan/distributors.html; 2 page; Archived on Apr. 19, 2003.
Imagenex Sportscan Installation / Setup Manual (date unknown).
Imagenex Technology Corp., Model 881 Digital Tilt Adjust Imaging Sonar; Hardware Specifications; Aug. 12, 2002; 3 pages.
Imagenex Technology Corp., Model 881 SportScan, Single or Dual Frequency Digital Sidescan Sonar, Software User's Manual; May 9, 2003; 16 pages.
Imagenex Technology Corp.; YellowFin SideScan Sonar, (Model 872); user's manual; data storage file format; Ethernet interface specification, and Ethernet setup guide; Nov. 2004; 46 pages.
Innomar-Products; "System Variants: SES Side Scan Option"; Retrieved from internet URL:http://www.innomar.com/produ-2000sidescan.html; Dec. 30, 2003; 2 pages.
International Preliminary Report on Patentability for Application No. PCT/US05/27436 dated Dec. 6, 2007; 5 pages.
International Search Report and Written Opinion for Application No. PCT/US2010/039441 dated Oct. 11, 2010.
International Search Report and Written Opinion for Application No. PCT/US2010/039443 dated Oct. 6, 2010.
International Search Report and Written Opinion for Application No. PCT/US2012/046062 dated Dec. 14, 2012.
International Search Report for Application No. PCT/US05/27436 dated Nov. 20, 2007; 1 page.
Invalidity Contention; U.S. Pat. No. 8,300,499 Invalidity Claim Chart; Exhibit B01—Tri-Beam; Feb. 12, 2014; 31 pages.
Invalidity Contention; U.S. Pat. No. 8,300,499 Invalidity Claim Chart; Exhibit B02—Hydrography, Humminbird 757 c; Feb. 12, 2014; 38 pages.
Invalidity Contention; U.S. Pat. No. 8,300,499 Invalidity Claim Chart; Exhibit B03—Airmar-R209, Humminbird 757 c; Feb. 12, 2014; 43 pages.
Invalidity Contention; U.S. Pat. No. 8,300,499 Invalidity Claim Chart; Exhibit B04—Airmar-R209, Hydrography, Humminbird 757c, Sato, Aimar-R99, Zimmerman; Feb. 12, 2014; 59 pages.

(56) References Cited

OTHER PUBLICATIONS

Invalidity Contention; U.S. Pat. No. 8,300,499 Invalidity Claim Chart; Exhibit B05—Odom Echoscan; Feb. 12, 2014; 45 pages.
Invalidity Contention; U.S. Pat. No. 8,300,499 Invalidity Claim Chart; Exhibit B06—Kongsberg EA 400/600; Feb. 12, 2014; 37 pages.
Invalidity Contention; U.S. Pat. No. 8,300,499 Invalidity Claim Chart; Exhibit B07—Nishimori, Thompson, Betts, Zimmerman, Melvin, Tri-Beam, Odom Echoscan; Feb. 12, 2014; 22 pages.
Invalidity Contention; U.S. Pat. No. 8,300,499 Invalidity Claim Chart; Exhibit B08—Hydrography, Betts et al, Humminbird 997c and 757c; Feb. 12, 2014; 61 pages.
Invalidity Contention; U.S. Pat. No. 8,300,499 Invalidity Claim Chart; Exhibit B09—Humminbird 997c; Feb. 12, 2014; 40 pages.
Invalidity Contention; U.S. Pat. No. 8,300,499 Invalidity Claim Chart; Exhibit B10—Betts; Feb. 12, 2014; 29 pages.
Invalidity Contention; U.S. Pat. No. 8,305,840 Invalidity Claim Chart; Exhibit A01—Hydrography; Feb. 12, 2014; 30 pages.
Invalidity Contention; U.S. Pat. No. 8,305,840 Invalidity Claim Chart; Exhibit A02—Hydrography, Lustig; Feb. 12, 2014; 42 pages.
Invalidity Contention; U.S. Pat. No. 8,305,840 Invalidity Claim Chart; Exhibit A03—Hydrography, Adams; Feb. 12, 2014; 49 pages.
Invalidity Contention; U.S. Pat. No. 8,305,840 Invalidity Claim Chart; Exhibit A04—Hydrography, Boucher '522; Feb. 12, 2014; 39 pages.
Invalidity Contention; U.S. Pat. No. 8,305,840 Invalidity Claim Chart; Exhibit A05—Hydrography, Boucher '522, Adam; Feb. 12, 2014; 54 pages.
Invalidity Contention; U.S. Pat. No. 8,305,840 Invalidity Claim Chart; Exhibit A06—Hydrography, Adams, Betts; Feb. 12, 2014; 29 pages.
Invalidity Contention; U.S. Pat. No. 8,305,840 Invalidity Claim Chart; Exhibit A07—Hydrography, Boucher '522, Adam, Betts; Feb. 12, 2014; 33 pages.
Invalidity Contention; U.S. Pat. No. 8,305,840 Invalidity Claim Chart; Exhibit A08—Hydrography, Boucher '798, DeRoos, Adams; Feb. 12, 2014; 46 pages.
Invalidity Contention; U.S. Pat. No. 8,305,840 Invalidity Claim Chart; Exhibit A09—Hydrography, Boucher '798, DeRoos, Adams, Betters; Feb. 12, 2014; 33 pages.
Invalidity Contention; U.S. Pat. No. 8,305,840 Invalidity Claim Chart; Exhibit A10—Furuno; Feb. 12, 2014; 58 pages.
Invalidity Contention; U.S. Pat. No. 8,305,840 Invalidity Claim Chart; Exhibit A11—Airmar P48; Feb. 12, 2014; 70 pages.
Invalidity Contention; U.S. Pat. No. 8,305,840 Invalidity Claim Chart; Exhibit A12—Cargill et al; Feb. 12, 2014; 89 pages.
Invalidity Contention; U.S. Pat. No. 8,305,840 Invalidity Claim Chart; Exhibit A13—Kongsberg EA 400/600; Feb. 12, 2014; 57 pages.
Invalidity Contention; U.S. Pat. No. 8,305,840 Invalidity Claim Chart; Exhibit A14—Sato; Feb. 12, 2014; 6 pages.
Invalidity Contention; U.S. Pat. No. 8,305,840 Invalidity Claim Chart; Exhibit A15—Chiang, E-Series; Feb. 12, 2014; 5 pages.
Invalidity Contention; U.S. Pat. No. 8,305,840 Invalidity Claim Chart; Exhibit A16—Bird, Wilcox, Nishimori, Hamada, Blue, Fatemi-Boosheri, Boucher '798, Thompson, Betts, Zimmerman, P48, Tri-Beam, Imagenex, Odom Echoscan; Feb. 12, 2014; 40 pages.
Invalidity Contention; U.S. Pat. No. 8,305,840 Invalidity Claim Chart; Exhibit A17—Hydrography, Humminbird 997c, Betts; Feb. 12, 2014; 69 pages.
Invalidity Contention; U.S. Pat. No. 8,305,840 Invalidity Claim Chart; Exhibit A18—Humminbird 997c; Feb. 12, 2014; 83 pages.
Invalidity Contention; U.S. Pat. No. 8,305,840 Invalidity Claim Chart; Exhibit A19—Betts; Feb. 12, 2014; 49 pages.
J. Green, Maritime Archaeology: A Technical Handbook, ISBN 0-12-298632-6, 2004, pp. 1-468.
Jonsson, J., et al. "Simulation and Evaluation of Small High-Frequency Side-Scan Sonars using COMSOL"; Excerpt from the Proceedings of the COMSOL Conference; 2009; Milan, Italy.

Judgment of Inter Partes Review of U.S. Pat. No. 8,305,840; IPR2013-00355; dated Mar. 25, 2014; United States Patent and Trademark Office; 3 pages.
Judgment of Inter Partes Review of U.S. Pat. No. 8,305,840; IPR2013-00496; dated Mar. 25, 2014; United States Patent and Trademark Office; 3 pages.
Judgment of Inter Partes Review of U.S. Pat. No. 8,305,840; IPR2013-00497; dated Mar. 25, 2014; United States Patent and Trademark Office; 3 pages.
Kelly, D., The Scoop on Scanning Sonar, Motor Boating and Sailing, pp. 51, 70-71 (Aug. 1976).
Kelvin Hughes Transit Sonar; ". . . a new dimension in shallow water survey to assist in . . . "; Hydrography; Dredging; Salvage; Underwater Construction and Similar Works; Mar. 1966; 8 pages.
Key, W.H.; "Side Scan Sonar Technology"; Oceans 2000 MTS/IEEE Conference and Exhibition; vol. 2; Sep. 2000; pp. 1029-1033.
Kielczynski, P., et al.; "Finite Element Method (FEM) and Impulse Response Method (IRM) analysis of circular and rectangular transducers"; 1995 IEEE Ultrasonics Symposium; 1995; pp. 693-693.
Klein Associates Brochure: Hydroscan for Pipeline Survey (date unknown).
Klein Associates Brochure: Klein Smartfish, A Proven Platform for Deep Tow Applications (date unknown).
Klein Associates Brochure: System 3900-Dual-Frequency Side Scan Sonar for Search and Recovery (Nov. 2008).
Klein Associates Product Catalog Supplement: Sub-Bottom Profiler & Microprofiler (Supplement to HYDROSCAN catalog) (Nov. 1983).
Klein Associates, Inc., Klein Hydroscan System, 1983; 52 pages.
Klein Associates, Inc.; 1985 "Side Scan Sonar Training Manual", Side scan Sonar Record Interpretation; 151 pages.
Klein Associates, Inc.; Modular Side Scan Sonar and Sub-Bottom Profiler System Components for Customized Configurations; date unknown; 10 pages.
Klein Digital Sonar Systems, ". . . The Next Generation From the World Leader in Side Scan Sonar and Sub-bottom Profiling Systems," 1988.
Klein Hydroscan Applications Bulletin: Oil and Gas Pipeline Routing, Laying and Inspection, (Jan. 1983).
Klein, M. et al., Sonar—a modern technique for ocean exploitation; IEEE Spectrum; Jun. 1968; pp. 40-46 and Authors page.
Klein, Martin; New Capabilities of Side Scan Sonar Systems; date unknown; pp. 142-147.
Klein, Martin; New Developments in the Side Scan Sonar for Hydrography; date unknown; 14 pages.
Klein, Martin; Sea Floor Investigations Using Hybrid Analog/Digital Side Scan Sonar; date unknown; 18 pages.
Klein, Martin; Side Scan Sonar; Offshore Services; Apr. 1977, pp. 67, 68, 71, 72, 75.
Klein, Martin; Side Scan Sonar; UnderSea Technology; Apr. 1967; 4 pages.
Kongsberg Brochure EA 400 Survey; "A complete, integrated survey system"; Kongsberg Maritime AS; Oct. 2003.
Kongsberg Brochure EA 400/600 "Sidescan Echo sounder with combined sidescan and depth soundings"; Kongsberg Maritime AS; May 2004.
Kongsberg Maritime AS; Side Looking Transducer, 200 kHz-0.5×49, 200 kHz side looking transducer for shallow water and surveying and high resolution; date unknown; 2 pages.
Kongsberg Publication; Pohner, Freddy et al.; Integrating imagery from hull mounted sidescan sonars with multibeam bathymetry: 16 pages.
Kongsberg Simrad AS; ConCat Containerised Catamaran, Inshore hydrographic survey vessel that fits in a container, Rev. B, Apr. 2004; 4 pages.
Kozak, G.; "Side Scan Sonar Target Comparative Techniques for Port Security and MCM Q-Route Requirements"; L-3 Commuincia-tions; Klein Associates, Inc.; [Online]; Retrieved from the Internet <URL:http://www.chesapeaketech.com/techniques-port-security.pdf; 11 pages.
Krotser, D.J., et al.; "Side-Scan Sonar: Selective Textural Enhancement"; Oceans'76; Washington, DC; Sep. 1976.

(56) References Cited

OTHER PUBLICATIONS

Kucharski, William M., and Clausner, James E., Underwater Inspection of Coastal Sturctures Using Commercially Available Sonars, Technical Report REMR-CO-11, US Army Corps of Engineers, Department of the Army (Feb. 1990).

Kurie, F.N.D. Design and Construction of Crystal Tranducers, Office of Scientific Research and Development Washington D C., (1946).

Kvitek, R.G., et al.; "Victoria Land Latitudinal Gradient Project: Benthic Marine Habitat Characterization"; California State University; Monterey Bay; Field Report; Feb. 25, 2004.

Kvitek, Rikk et al.; Final Report, Early Implementation of Nearshore Ecosystem Database Project Tasks 2 and 3; http://seafloor.csumb.edu/taskforce/html%202%20web/finalreport.htm; Jul. 29, 1999; 92 pages.

L-3 Communications SeaBeam Instruments Technical Reference: Multibeam Sonar Theory of Operation, (2000).

Langeraar, W.; "Surveying and Charting of the Seas"; Elsevier Oceanography Series; vol. 37; Sep. 1983; p. 321.

Law, G., Sideways Glance, Side- and down-scan Imaging Open New Windows in Fishing Finding, Electronics, Nov. 2011, pp. 28-29.

Leonard, John L.; Cooperative Autonomous Mobile Robots; date unknown; 11 pages.

Loeser, Harrison T., Sonar Engineering Handbook, Peninsula Publishing (1992).

Lowrance Electronics, Inc.; X-70A 3D Installation and Operation Instructions; 44 pages.

Lowrance HS-3DWN Transducer Assembly and Housing (Eagle IIID); Aug. 1994.

Lowrance LCX-18C & LCX-19C Fish-finding Sonar & Mapping GPS; Operation Instructions; © 2002; 200 pages.

Lowrance Transducers Product Information; 1 page.

Manley, J,E.; "Development of the Autonomous Surface Craft 'Aces'"; Oceans '97 MTS/IEEE Conference Proceedings; Oct. 1997; pp. 827-832.

Manley, J.E., et al.; "Evolution of the Autonomous Surface Craft 'AutoCat'"; Oceans 2000 MTS/IEEE Conference and Exhibition; vol. 1; Sep. 2000; pp. 403-408.

Marine Acoutics Society of Japan (Editor); "Basics and of Marine Acoustics"; Apr. 28, 2004; pp. 152-172.

Marine Sonic Technology, Ltd.; Sea Scan® PC Side Scan Sonar System Information/Specifications Sheet; Sep. 9, 2002; 10 pages.

Maritime surveys takes delivery of SeaBat 8160; Sea Technology, Jul. 2001; http://findarticles.com/p/articles/mi-qa5367/is-200107/ai-n21475675/; webside printed Jun. 30, 2010.

Mazel, C. H., 1984 "Inspection of Surfaces by Side-Scan Sonar," ROV '84 Remotely Operated Vehicle Conference of the Marine Technology Society, 7 pages.

Mazel, Charles H., Inspection of Surfaces by Side Scan Sonar, Proceedings of the Remotely Operated Vehicles Conference and Exposition, (1984).

McMillan, Ken, The Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).

Medwin, H. et al., Fundamentals of Acoustical Oceanography, Academic Press (1998).

Melvin, G., et al.; Commercial fishing vessels, automatic acoustic logging systems and 3D data visualization; ICES; Journal of Marine Science; vol. 59; Issue 1; 2002; pp. 179-189.

Mesotech; Mesotech Model 971 Sonar System Summary; Mar. 26, 1985, 2 pages.

Miller, S.P., Selected Readings in Bathymetric Swath Mapping, Multibeam Sonar System Design, University of California Santa Barbara (Apr. 1993).

Montgomery, E.T., et al., "Documentation of the U.S. Geological Survey Oceanographic Time-Series Measurement Database", USGS Open-File Report 2007-1194; 2 pages.

Morang, Andrew, Kucharski, William M., Side-Scan Investigation of Breakwaters at Calumet and Burns Harbors in Southern Lake Michigan, Oceans 86 Conference Record, pp. 458-465, Sep. 1986.

Naoi, J., et al.; "Sea Trial Results of a Cross Fan Beam Type Sub-Bottom Profiler;" Japanese Journal of Applied Physics, vol. 39, No. 5; dated May 2000.

Navico Design Report of Raytheon Electronics Side Looker Transducer; Mar. 12, 2010; 18 pages.

Newman, P., Durrant-Whyte, H., Using Sonar in Terrain-Aided Underwater Navigation, IEEE Proceedings, (May 1998).

Newman, P.M.; "MOOS—Mission Orientated Operating Suite"; Department of Ocean Engineering; Massachusetts Institute of Technology; 2002.

NOAA: Nautical Charting general information from public records; [Online]; Retrieved on Sep. 10, 2010 from the Internet < URL: http://www.nauticalcharts.noaa.gov/csdl/learn-hydroequip.html; 2 pages; http://www.nauticalcharts.noaa.gov/csdl/learn-hydroequip.html; 1 page; http://www.nauticalcharts.noaa.gov/csdl/PDBS.html; 2 pages; http://www.nauticalcharts.noaa.gov/hsd/pub.html; 1 page; http://www.nauticalcharts.noaa.gov/hsd/fpm/fpm.htm; 1 page; http://www.ozcoasts.gov.au/geom-geol/toolkit/Tech-CA-sss.jsp; 12 pages.

Noble, N., The Telltale Sound of Depth, Motor Boating and Sailing, pp. 23-24(Aug. 1976).

Oceanic Imaging Consultants (OIC) Inc.: GeoDAS SDV Geophysical Data Acquisition System Brochure.

Odom Echoscan™: For Sea Floor or Riverbed Surveys; Odom Hydrogrphic Systems; Apr. 26, 2002; 2 pages.

Odom Hydrographic Systems ECHOSCAN Manual; Revision 1.11; Apr. 26, 2002.

Office Action for European Application No. 10728530.6; dated Apr. 2, 2013.

Office Action for European Application No. 10729001.7; dated Apr. 5, 2013.

Office Action for Japanese Application No. 2012-267270 dated Dec. 2, 2013.

Office Action for Japanese Application No. 2013-037874 dated Mar. 26, 2014.

Office Action for Reexamination No. 90/009,956; dated Apr. 6, 2012; 32 pages.

Office Action for Reexamination No. 90/009,957; dated Jun. 4, 2012; 17 pages.

Office Action for Reexamination No. 90/009,958; dated Jun. 18, 2012; 19 pages.

Office Action for U.S. Appl. No. 11/195,107; dated Aug. 9, 2007; 7 pages.

Office Action for U.S. Appl. No. 11/195,107; dated Feb. 15, 2007; 5 pages.

Office Action for U.S. Appl. No. 11/195,107; dated Jul. 17, 2008; 7 pages.

Office Action for U.S. Appl. No. 11/195,107; dated Mar. 4, 2008; 7 pages.

Office Action for U.S. Appl. No. 11/195,107; dated May 12, 2009; 9 pages.

Office Action for U.S. Appl. No. 12/319,586; dated Mar. 2, 2010; 5 pages.

Office Action for U.S. Appl. No. 12/319,586; dated Sep. 3, 2009; 5 pages.

Office Action for U.S. Appl. No. 12/319,594; dated Jun. 8, 2009; 10 pages.

Office Action for U.S. Appl. No. 12/319,604; dated Sep. 29, 2009; 7 pages.

Office Action for U.S. Appl. No. 12/631,229; dated Sep. 9, 2010, 8 pages.

Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.

Onoe, M., and Tiersten, H.F., Resonant Frequencies of Finite Piezoelectric Ceramic Vibrators with High Electromechanical Coupling, IEEE Transactions of Ultrasonics Engineering, pp. 32-39 (Jul. 1963).

(56) References Cited

OTHER PUBLICATIONS

ONR Grant N66604-05-1-2983; Final Report; "Cooperative Autonomous Mobile Robots"; Retrieved from the Internet <URL: http://dodreports.com/pdf/ada463215.pdf; Post 2006.
Oughterson, B., Sophisticated Sonar Reveals Detailed Images Recently Unimaginable. Is It Too Much too Soon?, Basic Instincts, pp. 75-78.
Owner's Guide & Installation Instructions, Transam or Tolling Motor Mount, Chirp or Adjustable Wide-beam Transducer, Models: P48W, TM130M, TM150M, TM210H (2013).
Pappalardo, M., Directivity Pattern of a Linear Array Transducer in High Frequency Range, Journal de Physique, pp. 32-34 (Nov. 1972).
Patent Owner's Preliminary Response; Inter Partes Review of U.S. Pat. No. 8,305,840; IPR2013-00355; dated Sep. 17, 2014; Navico Holding AS; 110 pages.
Patent Owner's Preliminary Response; Inter Partes Review of U.S. Pat. No. 8,305,840; IPR2013-00496; dated Sep. 17, 2014; Navico Holding AS; 114 pages.
Patent Owner's Preliminary Response; Inter Partes Review of U.S. Pat. No. 8,305,840; IPR2013-00497; dated Sep. 17, 2014; Navico Holding AS; 102 pages.
Patterson, D.R., and J. Pope, Coastal Application of Side Scan Sonar, Proceedings of Coastal Structures '83, Mar. 1983.
PCT International Search Report and Written Opinion; PCT/IB2013/060285; dated Feb. 18, 2014.
PCT International Search Report and Written Opinion; PCT/US2013/047645; dated Sep. 27, 2013.
PCT International Search Report and Written Opinion; PCT/US2013/047869; dated Oct. 21, 2013.
PCT International Search Report and Written Opinion; PCT/US2013/047926; dated Oct. 11, 2013.
PCT International Search Report and Written Opinion; PCT/US2013/048129; dated Oct. 17, 2013.
PCT International Search Report and Written Opinion; PCT/US2013/048177; dated Oct. 21, 2013.
Petition for Inter Partes Review of U.S. Pat. No. 8,305,840; IPR2013-00355; dated Jun. 13, 2013; Raymarine, Inc.; 63 pages.
Petition for Inter Partes Review of U.S. Pat. No. 8,305,840; IPR2013-00496; dated Aug. 6, 2013; Raymarine, Inc.; 63 pages.
Petition for Inter Partes Review of U.S. Pat. No. 8,305,840; IPR2013-00497; dated Aug. 6, 2013; Raymarine, Inc.; 64 pages.
Plueddemann, A. J., et al.; "Design and Performance of a Self-Contained Fan-Beam ADCP;" IEEE Journal of Oceanic Engineering, vol. 26, No. 2; dated Apr. 2001.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Prickett, T.; "Underwater Inspection of Coastal Structures"; The REMR Bulletin; vol. 14; No. 2; Aug. 1997.
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
QPS b.v.,: Qinsy User Manual (Apr. 27, 2004).
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
Raymarine, L750 Fishfinder, Operation Handbook; date unknown; 93 pages.
Raymarine: A65 GPS Chartplotter Owners Handbook; © Raymarine 2006; 100 pages.
Raymarine: DSM25 Digital Sounder Module Owner's Handbook; 62 pages.
Raymarine: E-series Networked Display: Reference Manual; Mar. 2006; 51 pages.
Raytheon Marine Company; Installation Instructions; Oct. 1998; 2 pages.
Remtechsroy Group; Side Scan Sonar—Remotely Operated Vehicle Surface; http://remtechnology.en.ec21.com/Side-Scan-Sonar-Remotely-Operated-2902034-2902230.html; printed on Feb. 12, 2010; 4pages.
RESON Inc.; SeaBat 8101 Product Specification, 240kHZ Multibeam Echo Sounder; © 1999; 2 pages.
RESON; SeaBat 8101; Multibeam acoustic echosounder; date unknown; 1 page.
RESON; SeaBat 8160 Product Specification, Multibeam Echosounder System; date unknown; 2 pages.
Response to European Search Report for European Patent Application No. 05782717.2-2220; dated Mar. 23, 2012; Johnson Outdoors, Inc.; 35 pages.
Riordan, J., et al.; "Implementation and Application of a Real-time Sidescan Sonar Simulator;" Oceans 2005—Europe, vol. 2; dated Jun. 2005.
Ronhovde, A., High Resolution Beamforming of Simrad EM3000 Bathymetric Multibeam Sonar Data, Cand Scient thesis, University of Oslo, Norway. (Oct. 1999).
Rossing, Thomas D., Sonofusion??, ECHOES: The Newsletter of the Acoustical Society of America, vol. 12, No. 2 (Spring. 2002).
Rusby, Stuart, A Long Range Side-Scan Sonar for Use in the Deep Sea (Gloria Project) Int. Hydrogr. Rev., pp. 25-39 (1970).
Russell-Cargill, W.G.A. ed.; Recent Developments in Side Scan Sonar Techniques; © 1982; 141 pages.
SeaBat 8101 Product Specification; 240kHz Multibeam Echo Sounder; © 1999 RESON Inc.; Version 4.0.
Search Report for European Application No. 12195752.6; dated Mar. 7, 2013.
Sherman, C. & J. Butler, Transducers and Arrays for Underwater Sound, Springer Sci. & Bus. Media, 1st ed. (2007).
Shono, K., et al.; "Integrated Hydro-Acoustic Survey Scheme for Mapping of Sea Bottom Ecology"; Ocean Research Institute; Tokyo, Japan; Nov. 2004.
Side Scan PC Operation Manual: SSS-100k PC, SSS-600K PC, SSS-100k/600K PC Side Scan Sonar Operation and Maintenance Manual, JW Fishers MFG Inc (date unknown).
Sidefinder—Reviews & Brand Information—Techsonic Industries, Inc.; [Online]; [Retrieved on Dec. 7, 2011]; Retrieved from the Internet <URL: http://www.trademarkia.com/sidefinder-74113182.html>; 3 pages.
SIMRAD EA 500; Hydrographic Echo Sounder; Product Specifications; Revision: Sep. 1993.
SIMRAD EK 500 Fishery Research Echo Sounder Installation Manual (Jun. 2006).
SIMRAD EK 500 Fishery Research Echo Sounder Operator Manual (May 1996).
SIMRAD Kongsberg EM Series Multibeam Echo Sounder Operators Manual (2000).
Simrad; Product Specifications, Simrad EA 500 Side-looking Option; Feb. 1992, 1 page.
SOLAS Chapter V; Safety of Navigation, Jul. 1, 2002; [Online]; Retrived from the Internet URL:https://www.gov.uk/government/uploads/system/uploads/attachment-data/file/343175/solas-v-on-safety-of-navigation.pdf.
Somers, M.L., and Stubbs, A.R., Sidescan Sonar, IEE Proceedings, pp. 243-256, Jun. 1984.
Sonar Theory and Applications; Excerpt from Imagenex Model 855 Color Imaging Sonar User's Manual; Imagenex Technology Corp.; Canada; 8 pages.
SonarBeam Underwater Surveying System Using T-150P tow-fish hull mounted; [Online]; [Retrieved on Feb. 12, 2010 from the Internet <URL: http://dsmeu.en.ec21.com/Remotely-Operated-Sonar-Boat-System--618904-2479905.html; 4 pages.; http://www.remtechnology.en.ec21.com/Side-Scan-Sonar-Remotely-Operated--2902034.html; 4 pages; [Retrieved on Feb. 16, 2010 from the Internet <URL: http://dsmeu.en.ec21.com/Remotely-Operated-Sonar-Boat-System--618904-2479905.html; 4 pages; http://www.remtechnology.en.ec21.com/Side-Scan-Sonar-Remotely-Operated--2902230.html; 7 pages.

(56) References Cited

OTHER PUBLICATIONS

SonarWeb Pro [retrieved Feb. 10, 2015]. Via the Internet Archive Wayback Machine at https://web.archive.org/web/20090622013837/ http://chesapeaketech.com/prod-webpro.html (Jun. 22, 2009). 4 pages.
Sosin, M., Can Electronics Make You Almost as Smart as a Fish, Popular Mechanics, pp. 110-111 (Nov. 1976).
Spiess, F.N., and Tyce, R.C., Marine Physical Laboratory Deep Tow Instrumentation System, Deep Submergence Systems Project and Office of Naval Research, Report No. MPL-U-69/72, (Mar. 1973).
Spiess, F.N., Acoustic Imaging, Society of Photo-optical Instrumentation Engineers' Seminar-in-Depth on Underwater Photo-optical Instrumentation Applications, pp. 107-115 (Mar. 1971).
Stansfield, D., High Frequency Designs, Underwater Electroacoustic Transducers: A Handbook for Users and Designers, Bath University Press and Institute of Acoustics (1991).
Starfish 450H; Sidescan System; Tritech International Limited; UK.
Streed, C.A., et al., AQS-20 Through-The-Sensor Environmental Data Sharing, Proceedings of the SPIE Defense & Security Symposium (Mar. 2005).
Stride, A.H., A Linear Pattern on the Sea Floor and its Interpretation, National Institute of Oceanography, Wormley, Surrey, pp. 313-318 (1959).
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67pages.
Supplemental Response to second set of Interrogatories; International Trade Commission; Investigation No. 337-TA-898; dated Jan. 6, 2014; Raymarine, Inc.; 12 pages.
T297-00-01-01 Transducer housing outline drawing; Neptune Sonar Ltd.; © 2002.
Taylor, W.A., et al., Taking the Man out of the Minefield, Sea Technology 2007, vol. 48, No. 11, pp. 15-19 (Nov. 2007).
Tucker, M. J., and Stubbs, A. R., "Narrow-beam echo-ranger for fishery and geological investigations", British Journal of Applied Physics vol. 12:3 pp. 103-110 (1961).
Techsonic Industries, Inc., Humminbird Wide fish wide open!; brochure, 1997; 4 pages.
Techsonic Industries, Inc.; "Element, 455 kHz"; Schematic, Jun. 13, 1996.
Techsonic Industries, Inc.; "Mask, Acoustic"; Schematic, May 24, 1996.
Techsonic Industries, Inc.; Humminbird GPS brochure; © 1992; 10 pages.
Teleflex Electronic Systems; Humminbird 1997; © 1996; 24 pages.
The Humminbird GPS Navigational System. Nothing Else Even Close.; Humminbird Marine Information Systems®; 1992; 10 pages.
The Hydrographic Society—Corporate Member News—Kongsberg SIMRAD; Jul. 3, 2008; 7 pages.
The Imagenex SportScan; Digital Sidescan Sonar; "Redefining Image Clarity"; Imagenex Technology Corp.; © 2002.
The Norwegian and Finnish navies performing operations with the Kongsberg Hugin AUV and minesniper mine disposal vehicle in Finnish waters; FFU nytt; No. 3, Nov. 2003; p. 12.
Tokuyama, H. et al., Principles and Applications of Izanagi Oceanfloor Imaging Sonar System, Journal of the Japan Society of Photogrammetry and Remote Sensing, vol. 29, No. 2, 1990, pp. 76-83.
Trabant, Peter K.; Applied High-Resolution Geophysical Methods, Offshore Geoengineering Hazards; © 1984; 265 pages.
Trademark Electronic Search System (TESS); Word Mark: Sidefinder; [Online]; [Retrieved on Dec. 7, 2011]; Retrieved from the Internet.
Translation of Notice of Reason(s) for Rejection for Japanese Application No. 2007-524919 dated Aug. 16, 2011; 4 pages.
Trevorrow, M.V., et al.; "Description and Evaluation of a Four-Channel, Coherent 100-kHz Sidescan Sonar"; Defence R&D Canada-Atlantic; Dec. 2004.
Tritech International Limited; StarFish; 450H Hull-Mounted Sidescan System; date unknown: 2 pages.
Tritech Manual: Starfish Hull Mount Sonar System User Guide (date unkonwn).
Tritech Technical Data Sheet: ROV/AUV Side Scan—Sea King Side Scan Sonar (date unknown).
Triton Elics Intl.: ISIS Sonar® User's Manual, vols. 1 and 2(Jun. 2004).
Tyce, R.C., Deep Seafloor Mapping Systems a Review, Marine Tech. Soc. Journal., vol. 20, No. 4, pp. 4-16 (Dec. 1986).
U.S. Appl. No. 60/552,769, filed Mar. 12, 2004; Applicant: Terrence Schoreder.
Utra III 3D Installation and Operation Instructions; EAGLE™; © 1994.
Universal Sonar Limited; High Frequency Broad Band Line Array Type G27/300LQ; date unknown 2 pages.
Urick, R.J., Principles of Underwater Sound, 3rd Edition, McGraw-Hill Book Company, 1983.
USACE "Chapter 11, Acoustic Multibeam Survey Systems for Deep-Draft Navigation Projects," Apr. 1, 2004.
U-Tech Company Newsletter.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; . pp. 329-334.
Vernitron Product Catalog: Modern Piezoelectric Ceramics, Custom Material Product Catalog (date unknown).
Waite, A.D.; "Sonar for Practising Engineers"; Third Edition; John Wiley & Sons, Ltd.; West Sussex, England; © 2002; 323 pages.
Wang, H.S.C., Amplitude Shading of Sonar Transducer Arrays, The Journal of the Acoustical Society of America, pp. 1076-1084, (May 1975).
Wesmar Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Wesmar; 500SS Side Scan Brochure; May 1998; 2 pages.
Wesmar; 500SS Side Scan Owner's Manual; 82 pages.
Wesmar; 500SS Sidescan Brochure; Feb. 1985; 2 pages.
Wesmar; SHD 700SS Super High Definition Side Scan Sonar; date unknown; 4 pages.
Wesmar; SHD 700SS; "Super High Definition Side Scan Sonar with Color Video Display Capability", Operations Manual, May 1998, 45 pages.
Westinghouse Publication; "Side-Scan Sonar Swiftly Surveys Subsurface Shellfish"; May 1970; 4 pages.
Williams, J. P., Glancing Sideways, Nautical Know-How, Chesapeake Bay Magazine, May 2011 pp. 14-17.
Williams, S. Jeffress, Use High Resolution Seismic Reflection and Side-Scan Sonar Equipment for Offshore Surveys, CETA 82-5, U.S. Army Corps of Engineers Coastal Engineering Research Center (Nov. 1982).
Wilson http://flindersarchaeology.com/2011/10/25/side-scan-sonar-the-key-to-underwater-survey/, Oct. 25, 2011, pp. 1-5.
Wilson, O.B., An Introduction to the Theory and Design of Sonar Transducers, Navy Postgraduate School, Monterey, California (Jun. 1985).
Woollett, R.S., Sonar Transducer Fundamentals, Scientific and Engineering Studies, Naval Underwater Systems Center (1984).
Yamamoto, F. et al., Oceanfloor Imaging System—Izanagi, Journal of the Japan Society for Marine Surveys and Technology 1 (2), Sep. 1989, pp. 45-51, 53 and 54.
Yang, L., et al.; "Bottom Detection for Multibeam Sonars with Active Contours;" MTSIEEE Conference Proceedings, vol. 2; and dated Oct. 1997.
Sonar TRX Sidescan Sonar Software Website visited Jun. 28, 2016 http://www.sonartrx.com/web/.
Burlison, UnderSee Explorer Intro Video 1, https://www.youtube.com/watch?v=9WrRP2z7FKc, Nov. 2010 (Year: 2010).
Burlison, UnderSee Explorer Trolling Demo, https://www.youtube.com/watch?v=z409zjSomtY, Feb. 2011 (Year: 2011).

SYSTEMS AND ASSOCIATED METHODS FOR PRODUCING SONAR IMAGE OVERLAY

FIELD OF THE INVENTION

Embodiments of the present invention relate generally to sonar systems and, more particularly, to sonar systems, assemblies, and associated methods for producing sonar image for overlay.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. Sonar beams from a transducer assembly can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

In some instances, the resulting image may have inaccuracies or be inconsistent with a corresponding chart such that the image can be hard to read. Applicant has developed methods and systems detailed herein to improve the resulting sonar images.

BRIEF SUMMARY OF THE INVENTION

Overlaying a sonar image over a chart at a corresponding location can provide a beneficial and easy to understand view of the underwater environment for a user. In particular, a user can associate the underwater environment with their location and easily locate objects, such as fish and structure, under the water. However, in some cases, the watercraft may be close to a boundary of the body of water when the sonar data is gathered. In such a scenario, inaccurate sonar returns or preset display distances of the sonar image can cause the resulting sonar image to be displayed over the boundary and covering land. This can be confusing and can be difficult to decipher. Embodiments of the present invention provide systems and methods for cropping the sonar image for presentation over the chart such that no portion of the image extends beyond the boundary line of the body of water. This creates a smooth and easy to read sonar image/chart display.

An example embodiment of the present invention includes an apparatus comprising a processor and a memory including computer program code. The memory and the computer program code are configured to, with the processor, cause the apparatus to receive sonar data associated with an underwater environment relative to a watercraft at a location of a body of water. The memory and the computer program code are further configured to, with the processor, cause the apparatus to determine the location. The memory and the computer program code are further configured to, with the processor, cause the apparatus to determine a boundary of the body of water proximate the location, wherein the boundary corresponds to an edge of the body of water. The memory and the computer program code are further configured to, with the processor, cause the apparatus to generate an image based on the sonar data such that no portion of the image extends beyond the boundary. The memory and the computer program code are further configured to, with the processor, cause the apparatus to cause display of the image over a chart at the location such that the image does not extend beyond the boundary as indicated by the chart.

In some embodiments, the memory and the computer program code are further configured to, with the processor, cause the apparatus to generate the image by determining a portion of the image that extends beyond the boundary and removing the portion of the image prior to causing display of the image over the chart at the location.

In some embodiments, the memory and the computer program code are further configured to, with the processor, cause the apparatus to generate the image by comparing sonar image data based on the sonar data with one of a polyline or a polygon associated with the boundary and generating the image without sonar image data that extends past the one of the polyline or the polygon.

In some embodiments, the memory and the computer program code are further configured to, with the processor, cause the apparatus to determine a preset distance that corresponds to a desired distance from the watercraft that a user would like the image to span. Additionally, the memory and the computer program code are further configured to, with the processor, cause the apparatus to determine that the preset distance extends beyond the boundary.

In some embodiments, the memory and the computer program code are further configured to, with the processor, cause the apparatus to filter the sonar data to remove sonar data that extends beyond the boundary. In some embodiments, the sonar data includes a plurality of sonar returns that each define a distance component in a plane defined leading from the watercraft to the boundary. Additionally, the memory and the computer program code may be further configured to, with the processor, cause the apparatus to determine a boundary threshold distance in the plane leading from the watercraft to the boundary that corresponds to the distance from the watercraft to the boundary. Additionally, the memory and the computer program code may be further configured to, with the processor, cause the apparatus to filter the sonar data by removing each sonar return that defines a distance in the plane defined leading from the watercraft to the boundary that is greater than the boundary threshold distance.

In some embodiments, the sonar data is current sonar data and the location is the current location. In such embodiments, the memory and the computer program code may be further configured to, with the processor, cause the apparatus to determine the boundary of the body of water proximate the current location in substantially real-time and generate the image based on the current sonar data such that no portion of the image extends beyond the boundary in substantially real-time.

In some embodiments, the memory and the computer program code may be further configured to, with the processor, cause the apparatus to determine the boundary by determining one or more locations of the body of water that define a zero depth such that the boundary is determined based on current depth data.

In some embodiments, the memory and the computer program code are further configured to, with the processor, cause the apparatus to determine the boundary by determining a pre-stored boundary of the body of water.

In some embodiments, the sonar data is 3D sonar data.

Some example embodiments further provide a system with the apparatus detailed above. The system further comprises a transducer assembly configured to emit one or more sonar beams, receive return echoes of the one or more sonar beams, and convert the return echoes into the sonar data. The transducer assembly is configured to be affixed to the watercraft and is electrically connected to the apparatus. The system may further include a display device electrically connected to the apparatus and configured to display the image over the chart.

Some example embodiments of the present invention provide a method comprising receiving sonar data associated with an underwater environment relative to a watercraft at a location of a body of water. The method further comprises determining, by a processor, the location. The method further comprises determining a boundary of the body of water proximate the location, wherein the boundary corresponds to an edge of the body of water. The method further comprises generating an image based on the sonar data such that no portion of the image extends beyond the boundary. The method further comprises causing display of the image over a chart at the location such that the image does not extend beyond the boundary as indicated by the chart.

Some example embodiments of the present invention provide a non-transitory computer-readable medium comprised of at least one memory device having computer program instructions stored thereon. The computer program instructions are configured, when run by a processor, to receive sonar data associated with an underwater environment relative to a watercraft at a location of a body of water. The computer program instructions are further configured, when run by a processor, to determine the location. The computer program instructions are further configured, when run by a processor, to determine a boundary of the body of water proximate the location, wherein the boundary corresponds to an edge of the body of water. The computer program instructions are further configured, when run by a processor, to generate an image based on the sonar data such that no portion of the image extends beyond the boundary. The computer program instructions are further configured, when run by a processor, to cause display of the image over a chart at the location such that the image does not extend beyond the boundary as indicated by the chart.

BRIEF DESCRIPTION OF THE DRAWINGS

Figure 1:
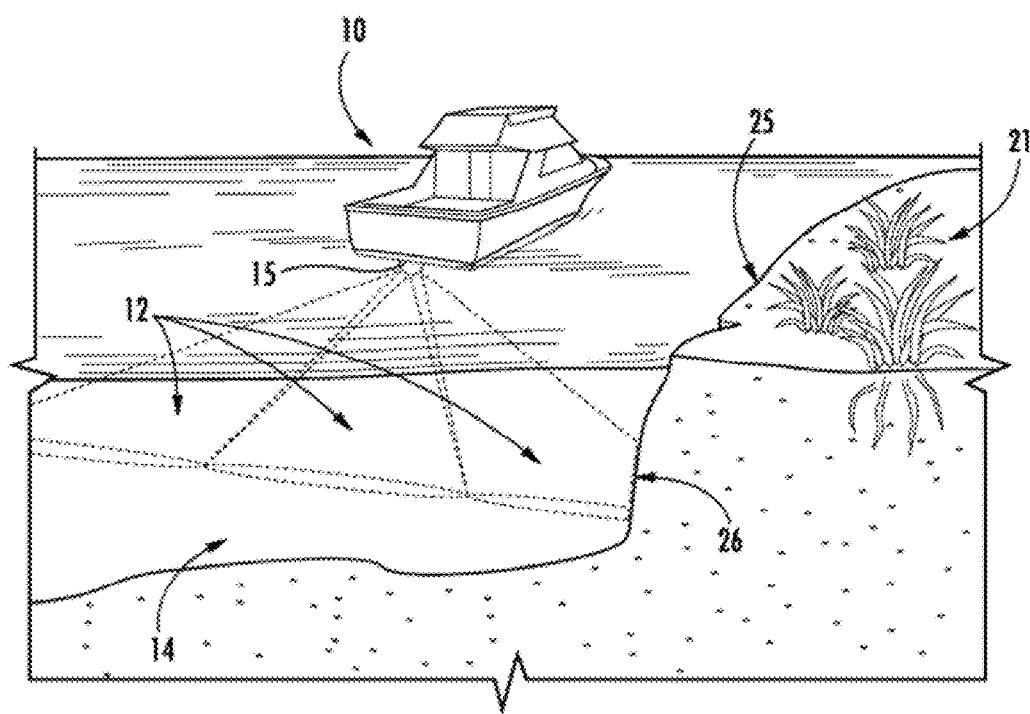
Figure 2:
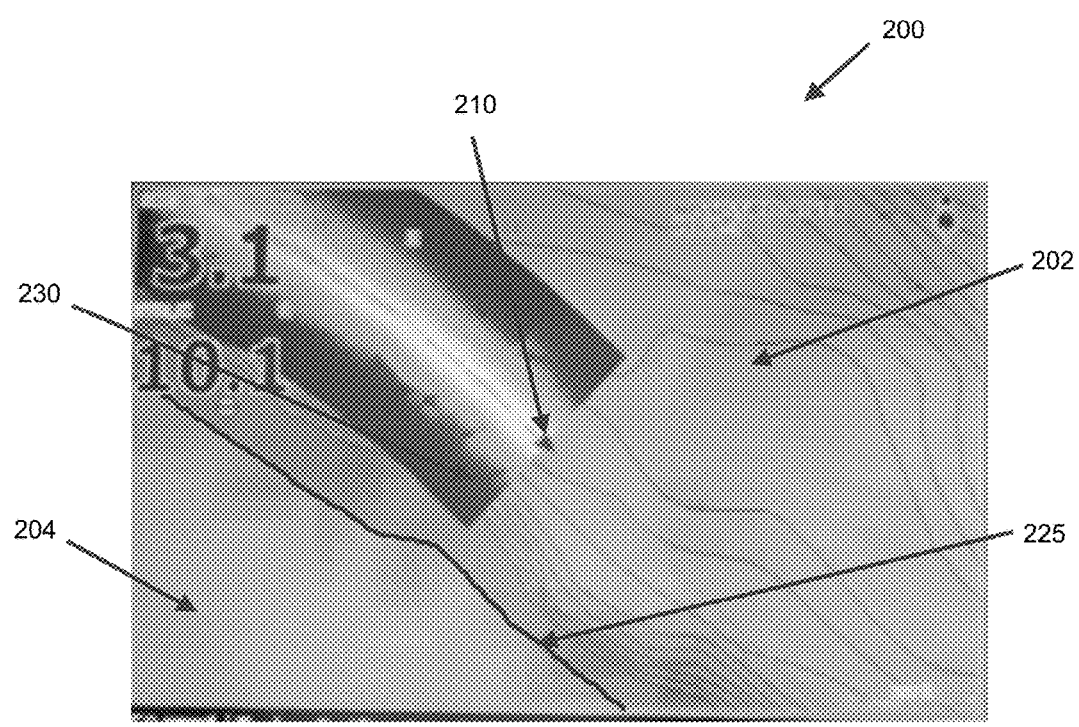
Figure 3A:
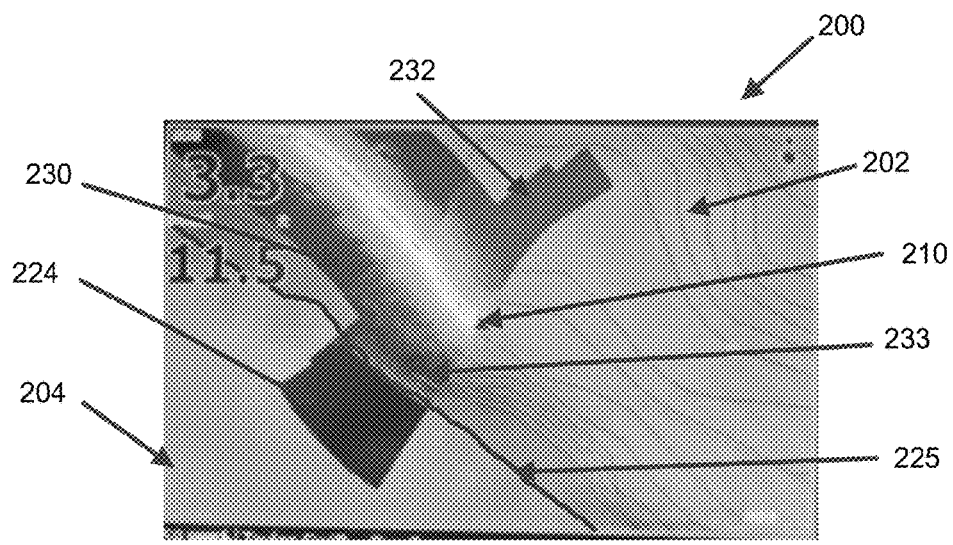
Figure 3B:
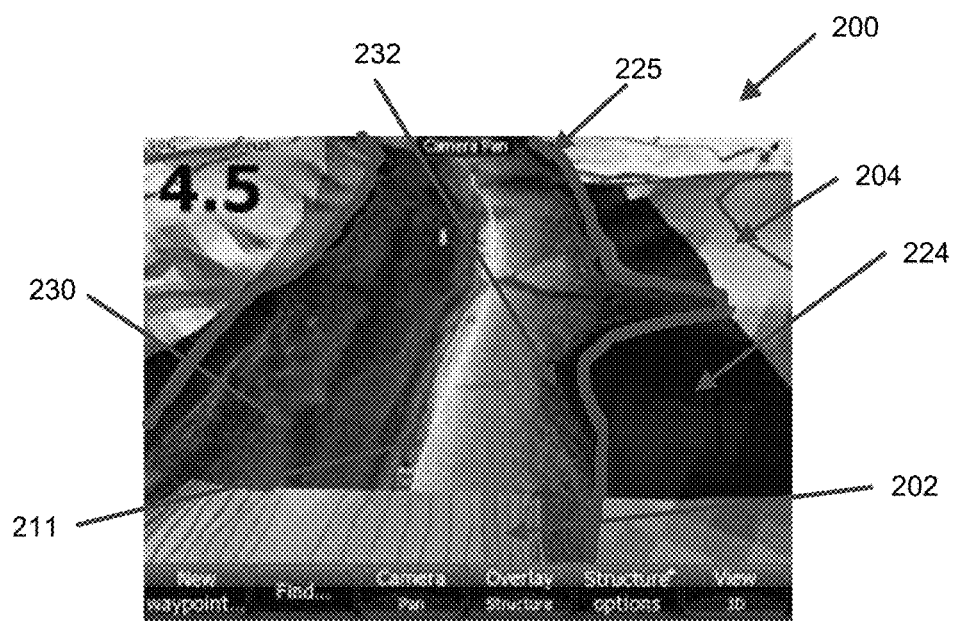
Figure 4:
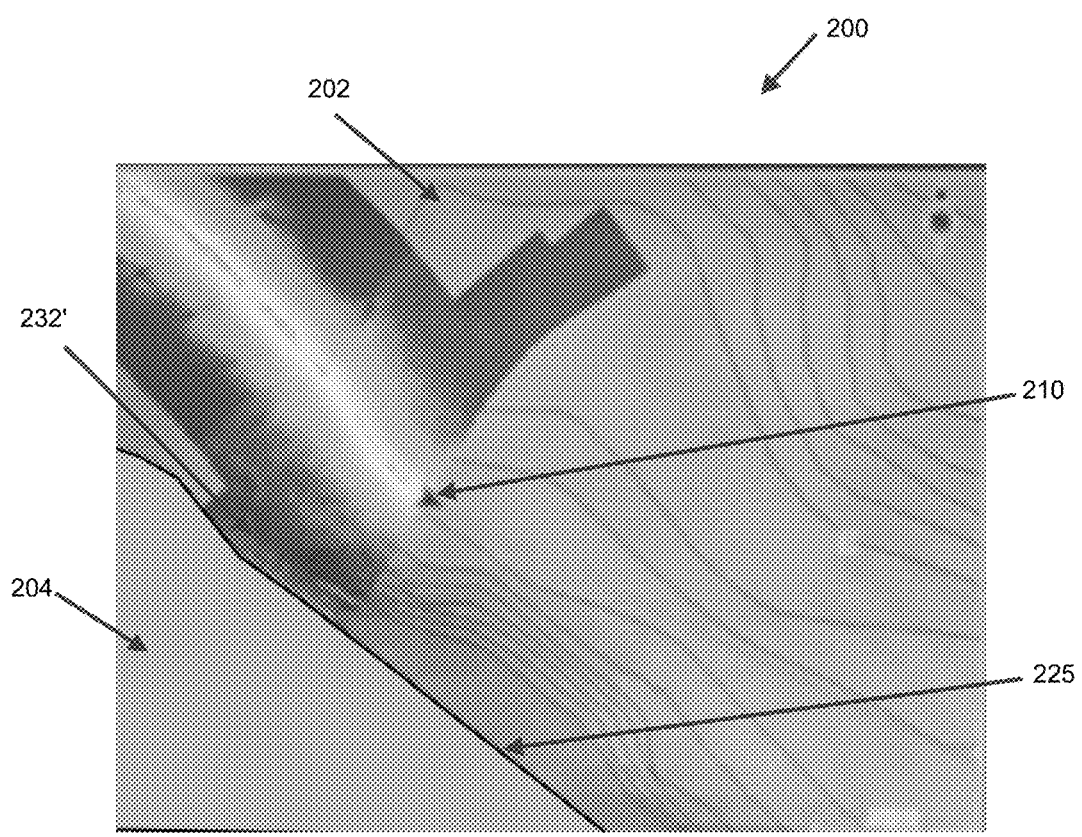
Figure 5:
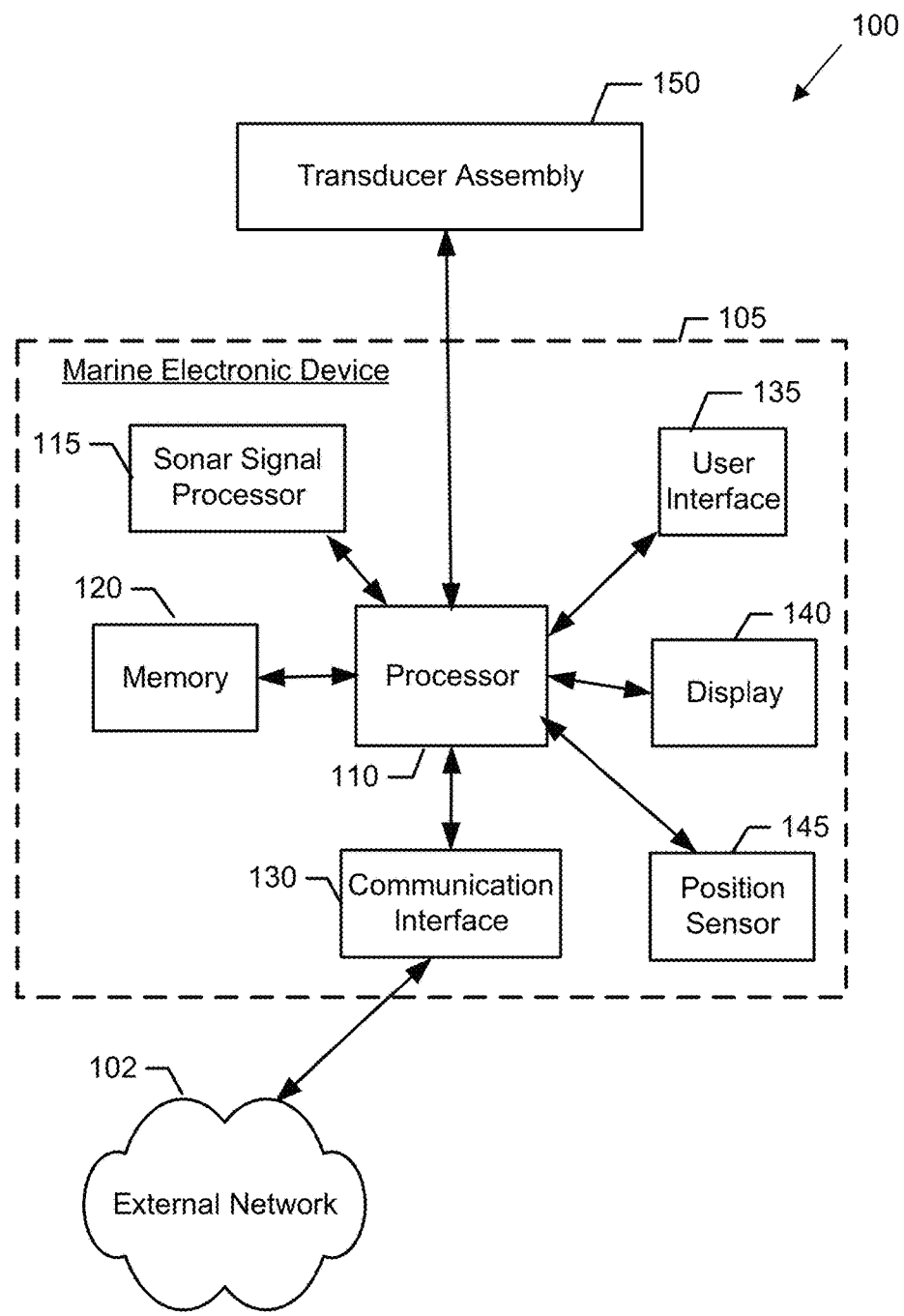
Figure 6:
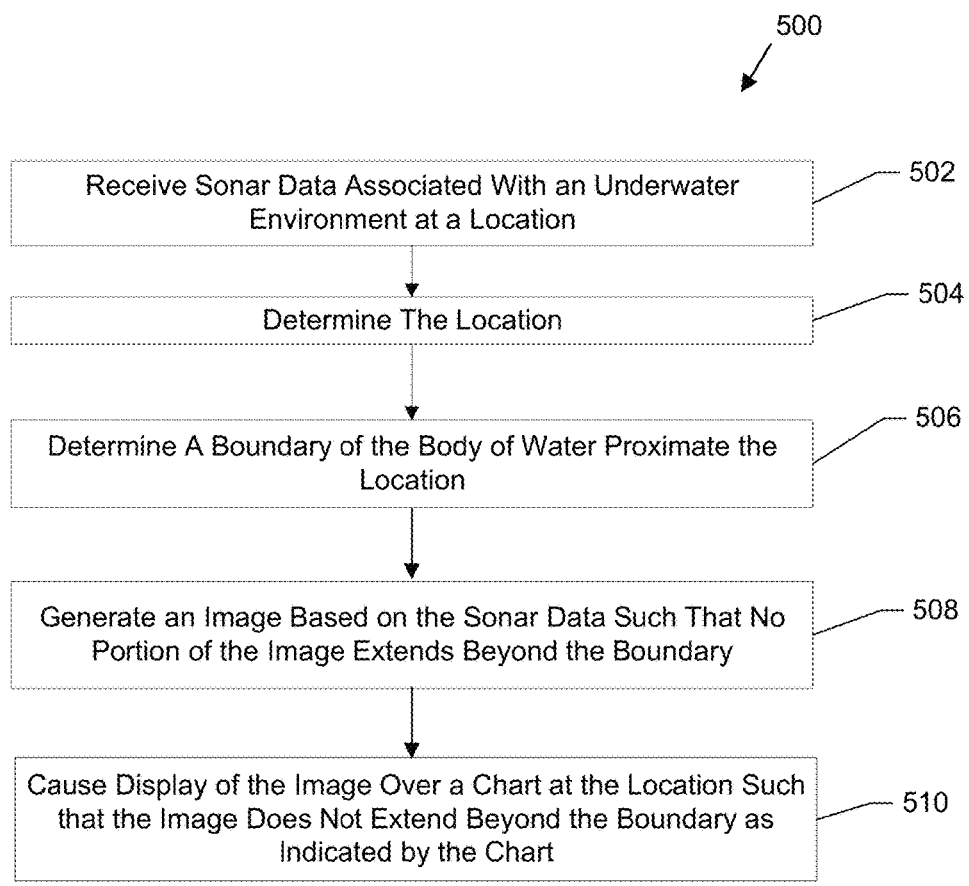

Having thus described the invention in general terms, reference will now be made to the accompanying drawings, which are not necessarily drawn to scale, and wherein:

FIG. 1 illustrates a watercraft emitting sonar beams near a boundary of the body of water, in accordance with some embodiments discussed herein;

FIG. 2 shows an example sonar image displayed over a chart, in accordance with some embodiments discussed herein;

FIGS. 3A and 3B each show an example sonar image displayed over a chart, wherein a portion of the sonar image extends beyond the boundary of the body of water on the chart, in accordance with some embodiments discussed herein;

FIG. 4 shows an example sonar image displayed over a chart, wherein the sonar image has been generated such that no portion of the image extends beyond the boundary, in accordance with some embodiments discussed herein;

FIG. 5 shows a block diagram illustrating an example sonar system, in accordance with some embodiments discussed herein; and FIG. 6 illustrates a flowchart of an example method of generating and displaying a sonar image according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems (e.g., sonar system 100 in FIG. 5) are commonly employed by boaters, sport fishermen, search and rescue personnel, researchers, surveyors, and others. With reference to FIG. 1, a watercraft 10 may include a sonar system that includes a transducer assembly 15. The transducer assembly 15 can be attached to the watercraft 10 and configured to transmit one or more sonar beams 12 (shown based on theoretical −3 dB range) into the underwater environment. Sonar signals from the one or more sonar beams can reflect off objects (such as the floor 14 of the body of water) and return (as sonar returns) to the transducer assembly 15. The transducer assembly 15 (such as through one or more transducers) is configured to convert the sonar returns into electrical energy to form sonar data. This sonar data is received by one or more marine electronic devices (e.g., marine electronic device 105 in FIG. 5) and used to generate an image of the underwater environment (e.g., a sonar image) that can be presented on a display (e.g., display 140 in FIG. 5).

Though the example illustrated transducer assembly 15 is attached so as to transmit the sonar beams 12 generally downwardly and to the side of the watercraft, other orientations/directions of the transducer assembly 15 are contemplated (e.g., forward facing, rearward facing, downward facing only, side facing only, among others without limitation). Likewise, while the example illustrated transducer assembly 15 is shown with three separate sonar beams that each have a fan-shape corresponding to a linear transducer, other sonar beam shapes (e.g., conical, elliptical, etc.), transducer shapes (circular, square, etc.), and number of transducers are contemplated by embodiments of the present invention without limitation.

Embodiments of the present invention provide a sonar system (e.g., sonar system 100 of FIG. 5) and associated methods for providing an improved sonar image for overlay, such as on a chart. In some embodiments, the sonar system 100 is configured to receive sonar data, such as from the transducer assembly (e.g., transducer assembly 15, 150), associated with an underwater environment relative to the watercraft. As detailed herein, using the sonar data, the sonar system 100 is configured to form a sonar image that can be displayed to a user on a display (e.g., display 140).

In some embodiments, the sonar system 100 is configured to display the sonar image over a chart at the location corresponding to where the sonar data was captured. In this regard, the sonar image builds up across the chart, showing the user detailed structure, which allows the user to easily discern the location of certain underwater objects. This can occur in real-time or can be later displayed. In some embodiments, the sonar image can be presented as an additional layer over the chart and can be presented with varying transparency levels—thereby allowing a user, in some cases, to still see a portion of the chart underneath the sonar image. FIG. 2 shows an example display 200 of a sonar image 230 being displayed over a chart 202 at a corresponding location of the watercraft 210 as it travels along. U.S. Pat. No.

9,182,486, entitled "Sonar Rendering Systems and Associated Methods" and co-assigned with the assignee of the present invention, provides additional detail regarding example systems and methods of overlaying sonar imagery on charts and other data and is hereby incorporated by reference herein in its entirety.

In some embodiments, the sonar system 100 is configured such that the sonar beams span a configured (e.g., preset, user-configured, etc.) distance out to the side, front, or back of the watercraft. For example, the sonar image 230 in FIG. 2 is the result of a preset distance (e.g., 60 ft.). In the depicted embodiment, the distance configured for the sonar system of the watercraft 210 is less than the distance from the watercraft 210 to the boundary 225 of the body of water. As such, the sonar image 230 is displayed over the chart 202 in clean looking manner, making it easy to discern the structure shown by the sonar image 230 and the details of the chart (such as the boundary line 225 and the land 204).

Referring back to FIG. 1, depending on the location of the watercraft 10 on the body of water and/or the configuration of the transducer assembly 15, one or more of the sonar beams may by projected into a boundary 25 of the body of water (e.g., the edge of the water and the land 21). In this regard, sonar signals from the one or more sonar beams may reflect off a surface 26 associated with the boundary 25. The resulting sonar image may show the curvature or features of the underwater surface 26 leading up to the boundary 25. For example, FIG. 3A illustrates a situation where the distance configuration of the sonar system has been changed to extend the reach of the sonar beams and thus the corresponding sonar image (e.g., from 60 ft. at 230 to 120 ft. at 232). In this regard, a portion of the sonar image 233 shows structure leading to the boundary 225 of the body of water. However, in addition to showing the structure leading up to the boundary 225, the sonar image 232 also shows sonar imagery displayed beyond the boundary 225 and onto the land 204 (e.g., portion 224 of the sonar image 232).

FIG. 3B illustrates another example where the sonar image 232 includes a portion 224 that extends beyond the boundary 225 of the body of water. In this circumstance, the watercraft has traveled along a track 211 of a river. The proximity of both edges of the land 204 cause a portion 224 of the sonar image 232 on both sides of the watercraft to be displayed beyond the respective boundaries 225.

The extended image beyond the boundary of the body of water can be, in some cases, a product of false or misread sonar returns. For example, referring to FIG. 1, while sonar returns should theoretically bounce off the surface 26 corresponding to the boundary 25, due to softness of the surface or other factors (e.g., multiple reflected sonar returns) sonar returns may be received by the transducer assembly 15 in such a manner as to indicate a false reading that would theoretically extend beyond the actual boundary.

Another factor that may lead to a portion of the image extending beyond the boundary is that the preset distance for the sonar beam from the watercraft may cause an extended rendering of the image to fill the extra space when forming the image. For example, with reference to FIG. 3A, the sonar beam 232 may be the result of a request by a user to capture sonar returns extending 120 ft. from the watercraft. When generating the image, the sonar system of the watercraft may determine that it does not have sonar returns extending all the way out to 120 ft. In such a scenario the sonar system may generate the image so as to fill in the extra space leading up to 120 ft.

Whether by false readings or extended rendering to account for lack of corresponding sonar returns (or some other reason), having a sonar image that extends beyond a boundary when displayed over a chart can be confusing and cause the overall image (chart and sonar image) to appear inconsistent and difficult to read. As such, as detailed herein, embodiments of the present invention seek to present a clearer and more accurate overall image by removing the portion of the sonar image that extends beyond the boundary of the body of water on the chart.

In some embodiments, the sonar system 100 is configured to gather sonar data, such as by receiving at a processor 110 (or sonar signal processor 115) of the marine electronic device 105 sonar data associated with an underwater environment relative to a watercraft at a location of a body of water.

In some embodiments, the sonar data is gathered using a transducer assembly 150. In some embodiments, the transducer assembly 150 is configured to emit one or more sonar beams, receive sonar return echoes of the one or more sonar beams, and convert the sonar return echoes into the sonar data. The transducer assembly 150 may be affixed to the watercraft and electrically connected to a marine electronic device 105 of the sonar system 100. For example, with reference to FIG. 1, the transducer assembly 15 may emit one or more sonar beams 12 into the underwater environment, receive sonar returns from the sonar beams and convert the sonar returns into sonar data for use by the marine electronic device 105 (shown in FIG. 5).

As noted above, embodiments of the present invention contemplate various orientations of the transducer assembly 150 with respect to the watercraft (e.g., downward facing, side facing, forward facing, rearward facing, etc.). Along these same lines, embodiments of the present invention also contemplate use with varying orientation or rotating transducer assemblies (e.g., on a trolling motor or other rotatable device). Further, some embodiments of the present invention contemplate use with different types of sonar data (e.g., 2D sonar data, 3D sonar data).

In some embodiments, the sonar system 100 is configured to determine the location corresponding to the received sonar data. For example, the sonar system may use the position sensor 145 to obtain a location of the watercraft when the sonar data is received. With reference to FIGS. 2, 3A, and 4, the sonar system may determine the current location of the watercraft 210 when the sonar data is received.

In some embodiments, the sonar system 100 is configured to determine a boundary of the body of water proximate the location, wherein the boundary corresponds to an edge of the body of water. For example, with reference to FIGS. 2, 3A, and 4, the sonar system may determine the boundary 225 of the body of water that is proximate the watercraft 210.

In some embodiments, the sonar system 100 is configured to determine only the portion of the boundary of the body of water that is proximate (or pertinent) to the current location and currently received sonar data. Alternatively, the sonar system 100 may be configured to determine the entire boundary of the body of water.

In this regard, the sonar system 100, such as through the processor 110 and/or memory 120, is configured to look up or determine the boundary of the body of water. Other means of obtaining the boundary include use of the communications interface 130 to obtain the information from an external network 102. In some embodiments, the boundary of the body of water may be pre-stored in one or more charts that are accessible by the sonar system. Additionally or alternatively, the sonar system 100 is configured to determine the boundary by determining a zero depth reading for the chart (e.g., a zero depth ring). In such a manner, the sonar system 100 may be configured to continually update the water level of the body of water to determine the zero depth and, thus, the boundary of the body of water based on the current depth. This provides a continuously updating method that provides high accuracy.

Once the boundary of the body of water is determined, the sonar system 100 may convert the information or generate a polyline or polygon that represents the boundary in graphical format (e.g., XY coordinates).

In some embodiments, the sonar system 100 is configured to determine a preset or user set distance that corresponds to a desired distance from the watercraft that a user would like the sonar image to span. As noted herein, the sonar system 100 can be configured such that the transducer assembly 150 emits sonar beams to gather sonar data corresponding to a set distance away from the watercraft (e.g., out to the side of or in front of the watercraft). For example, with reference to FIG. 3A, the distance setting changed between the gathering of sonar data for the sonar image(s) 230 versus the sonar data for the sonar image(s) 232. As such, in some embodiments, the sonar system 100 is configured to determine the set distance that the transducer assembly is configured to gather data from. In some embodiments, the transducer assembly gathers data at a preset transmit distance and the sonar system merely filters the data according to the indicated preset distance.

Using that information and the determined boundary, the sonar system 100 may then be configured to determine if the preset distance extends beyond the boundary of the body of water. For example, with reference to FIG. 3A, the sonar system (such as through the processor 110) may determine that the boundary 225 is 80 ft. to the starboard side of the watercraft 210, but that the sonar system has a preset distance of 120 ft. for the desired sonar image. In this case, the preset distance of the desired sonar image extends beyond the boundary 225. Thus, any sonar image that is presented on a chart will extend beyond the boundary of the body of water (see e.g., FIG. 3A).

In some embodiments, the sonar system 100 (such as through the processor 110 and/or sonar signal processor 115) is configured to generate an image (e.g., a sonar image) based on the sonar data such that no portion of the image extends beyond the boundary of the body of water. Further, in some embodiments, the sonar system 100 (such as through the processor 110 and the display 140) is configured to cause display of the image over a chart at the determined location such that the image does not extend beyond the boundary as indicated by the chart. For example, with reference to the displayed overall image 200 in FIG. 4, the sonar system has removed a portion of the sonar image, thus altering the sonar image 232' such that no portion of the sonar image extends beyond the boundary 225 when displayed over the chart 202. By removing the portion of the sonar image 232' that would extend beyond the boundary, a clearer and easier to read overall image (chart and sonar image) is presented to the user. This allows the user to distinguish the boundary of the water and more easily locate underwater features (e.g., structure, fish, etc.).

Embodiments of the present invention contemplate any number of different ways to generate the image with the portion extending beyond the boundary removed. In some embodiments, the boundary is determined and used to remove any portion of the image extending beyond the boundary prior to rendering. In this regard, in some embodiments, the sonar system 100 is configured to determine a portion (or multiple portions, pixels, sonar image data, etc.) of the image that extends beyond the boundary and remove that portion (or multiple portions, pixels, sonar image data, etc.) of the image prior to causing display of the image over the chart at the location.

In some embodiments, the sonar system 100 is configured to generate the image by comparing sonar image data based on the sonar data with one or more coordinates or other quantifiable factor/object (e.g., a polyline or a polygon) associated with the boundary of the body of water. Then, the image may be generated without sonar data that extends past the coordinate or other quantifiable factor/object (polyline or polygon). For example, in some embodiments, the boundary is formed as a polyline or a polygon with a coordinate (e.g., X, Y) denoting the boundary (or a portion of the boundary). As the image is being generated, each generated portion of the image (e.g., pixel) is checked against the coordinate denoting the boundary and either allowed to be generated or removed.

For example, in some embodiments, as the watercraft travels along, a strip of sonar data is gathered (e.g., to the sides of the watercraft). Due to the small size of the strip in the travelling direction, the received sonar data can be assumed to be one dimensional for purposes of generating the image (e.g., each sonar return may define a Y coordinate). Thus, as the sonar returns are converted into sonar image data for generation of the image, the sonar data can be assigned a Y coordinate. This Y coordinate can be checked against the boundary that the theoretical strip of sonar image data would intersect. The image can then be generated up to the boundary.

Though this example embodiment describes using a Y coordinate, embodiments of the present invention also contemplate use with two dimensional (2D) or three dimensional (3D) coordinates and 2D or 3D sonar data respectively. Thus, a 2D or 3D sonar image can be formed with a similar approach, where the planned portion (or pixel) of the image can be checked against a known boundary and either allowed to be generated or removed prior to generation of the image.

In some embodiments, the sonar system 100 may be configured to filter the sonar data to remove any sonar returns that extend beyond the boundary. For example, the received sonar data may include a plurality of sonar returns that each define one or more characteristics (e.g., time of the return). The one or more characteristics can be converted into coordinates that define the location of the sonar return (e.g., a 1D, 2D, or 3D coordinate system). Each sonar return can then be checked against the boundary that has been similarly assigned coordinates. For example, each sonar return may define a distance component in a plane defined leading from the watercraft to the boundary (e.g., a Y coordinate). The sonar system 100 may be configured to determine a boundary threshold distance in the plane leading from the watercraft to the boundary that corresponds to the distance from the watercraft to the boundary (e.g., a Y coordinate for the boundary). Then, the sonar system 100 may be configured to filter the sonar data by removing each sonar return that defines a distance in the plane defined leading from the watercraft to the boundary (e.g., Y coordinate for the sonar return) that is greater than the boundary threshold distance. This removes any faulty sonar returns from the sonar data prior to generation of the corresponding image. Though the above example embodiment details a single coordinate being used to filter the sonar data, other coordinate systems and dimensions are contemplated (e.g., 2D coordinates for sonar returns can be used to filter 2D sonar data, 3D coordinates for sonar returns can be used to filter 3D sonar data, etc.). Such example embodiments that filter the sonar data provide a cleaner set of sonar data that removes the faulty sonar returns to produce a more accurate image.

Embodiments of the present invention are contemplated to be used in substantially real-time (e.g., as the sonar data is being gathered). In such embodiments, the sonar system 100 is configured to determine the boundary of the body of water proximate the current location of the watercraft in substantially real-time and generate the image based on the current sonar data in substantially real-time such that no portion of the image extends beyond the boundary. In this regard, any configurations of the sonar system described herein can be performed in substantially real-time to provide an on the go accurate and useful overall image of the sonar image displayed over the chart. Additionally, however, embodiments of the present invention are also contemplated to be processed afterward (such as in a web application accessed by a user after returning home).

Example System Architecture

FIG. 5 shows a block diagram of an example sonar system 100 capable for use with several embodiments of the present invention. As shown, the sonar system 100 may include a number of different modules or components, each of which may comprise any device or means embodied in either hardware, software, or a combination of hardware and software configured to perform one or more corresponding functions. For example, the sonar system 100 may include a transducer assembly 150 and a marine electronic device 105.

The sonar system 30 may also include one or more communications modules configured to communicate with one another in any of a number of different manners including, for example, via a network. In this regard, the communications module 38 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g., a marine electronic device 105) may be included in the sonar system 100.

The marine electronic device 105 may include a processor 110, a sonar signal processor 115, a memory 120, a user interface 135, a display 140, one or more sensors (e.g., position sensor 145, orientation sensor (not shown), etc.), and a communication interface 130.

The processor 110 (e.g., a sonar signal processor 115) may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide sonar data indicative of the size, location, shape, etc. of objects detected by the sonar system 100. For example, the processor 110 may be configured to receive sonar return data and process the sonar return data to generate sonar image data for display to a user (e.g., on display 140).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 120 may be configured to store instructions, computer program code, marine data, such as sonar data, chart data, location/position data, and other data associated with the sonar system in a non-transitory computer readable medium for use, such as by the processor.

The communication interface 130 may be configured to enable connection to external systems (e.g., an external network 102). In this manner, the marine electronic device 105 may retrieve stored data from a remote, external server via the external network 102 in addition to or as an alternative to the onboard memory 120.

The position sensor 145 may be configured to determine the current position and/or location of the marine electronic device 105. For example, the position sensor 145 may comprise a GPS or other location detection system.

The display 140 may be configured to display images and may include or otherwise be in communication with a user interface 135 configured to receive an input from a user. The display 140 may be, for example, a conventional LCD (liquid crystal display), a touch screen display, mobile device, or any other suitable display known in the art upon which images may be displayed.

In any of the embodiments, the display 140 may present one or more sets of marine data (or images generated from the one or more sets of data). Such marine data includes chart data, radar data, weather data, location data, position data, orientation data, sonar data, or any other type of information relevant to the watercraft. In some embodiments, the display may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, the sonar image may be applied to (or overlaid onto) a chart (e.g., a map or navigational chart). Additionally or alternatively, depth information, weather information, radar information, or any other sonar system inputs may be applied to one another.

The user interface 135 may include, for example, a keyboard, keypad, function keys, mouse, scrolling device, input/output ports, touch screen, or any other mechanism by which a user may interface with the system.

Although the display 140 of FIG. 5 is shown as being directly connected to the processor 110 and within the marine electronic device 105, the display 140 could alternatively be remote from the processor 110 and/or marine electronic device 105. Likewise, in some embodiments, the sonar signal processor 115, the position sensor 145, and/or user interface 135 could be remote from the marine electronic device 105.

The transducer assembly 150 according to an exemplary embodiment may be provided in one or more housings that provide for flexible mounting options with respect to the watercraft. In this regard, for example, the housing may be mounted onto the hull of the watercraft or onto a device or component that may be attached to the hull (e.g., a trolling motor or other steerable device, or another component that is mountable relative to the hull of the vessel), including a bracket that is adjustable on multiple axes, permitting omnidirectional movement of the housing.

The transducer assembly 150 may include one or more transducers or transducer elements positioned within the housing. Each transducer may be configured as transmit/receive, transmit-only, or receive-only with respect to transmitting one or more sonar beams and receiving sonar returns. In some embodiments, each of the transducer elements may be positioned within the housing so as to point toward a predetermined area under, to the side, or the front of the watercraft. The shape of a transducer element may largely determine the type of beam that is formed when that transducer element transmits a sonar pulse (e.g., a circular transducer element emits a cone-shaped beam, a linear transducer emits a fan-shaped beam, etc.). Embodiments of the present invention are not limited to any particular shape transducer. Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Further, transducers may configured to transmit and/or receive at different frequencies. In this regard, embodiments of the present invention are not meant to be limited to certain frequencies.

Additionally, in some embodiments, the transducer assembly 150 may have a sonar signal processor (e.g., sonar signal processor 115) and/or other components positioned within the housing. For example, one or more transceivers (e.g., transmitter/receiver), transmitters, and/or receivers may be positioned within the housing and configured to cause the one or more transducers to transmit sonar beams and/or receive sonar returns from the one or more transducers. In some embodiments, the sonar signal processor, transceiver, transmitter, and/or receiver may be positioned in a separate housing.

Example Flowchart(s) and Operations

Embodiments of the present invention provide methods, apparatus and computer program products for providing accurate sonar images for overlay onto a chart such that no portion of the sonar image extends beyond a boundary of the body of water indicated by the chart. Various examples of the operations performed in accordance with embodiments of the present invention will now be provided with reference to FIG. 6.

FIG. 6 illustrates a flowchart according to an example method for providing accurate sonar images for overlay onto a chart such that no portion of the sonar image extends beyond a boundary of the body of water indicated by the chart according to an example embodiment 500. The operations illustrated in and described with respect to FIG. 6 may, for example, be performed by, with the assistance of, and/or under the control of one or more of the processor 110, sonar signal processor 115, memory 120, communication interface 130, user interface 135, position sensor 145, display 140, and/or transducer assembly 150. Operation 502 may comprise receiving sonar data associated with an underwater environment at a location of a watercraft. The processor 110, sonar signal processor 115, and/or transducer assembly 150 may, for example, provide means for performing operation 502. Operation 504 may comprise determining the location of the watercraft. The processor 110, sonar signal processor 115, position sensor 145, and/or communication interface 130 may, for example, provide means for performing operation 504. Operation 506 may comprise determining a boundary of the body of water proximate the location. The processor 110, sonar signal processor 115, memory 120, and/or communication interface 130 may, for example, provide means for performing operation 506. Operation 508 may comprise generating an image based on the sonar data such that no portion of the image extends beyond the boundary. The processor 110 and/or sonar signal processor 115 may, for example, provide means for performing operation 508. Operation 510 may comprise causing display of the image over a chart at the location such that the image does not extend beyond the boundary as indicated by the chart. The processor 110, sonar signal processor 115, communication interface 130, display 140, and/or memory 120 may, for example, provide means for performing operation 510.

FIG. 6 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120 and executed by, for example, the processor 110 or sonar signal processor 115. As will be appreciated, any such computer program product may be loaded onto a computer or other programmable apparatus (for example, a marine electronic device 105) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 105) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus comprising a processor and a memory including computer program code, the memory and the computer program code configured to, with the processor, cause the apparatus to:
receive sonar data associated with an underwater environment relative to a watercraft at a location of a body of water, wherein the sonar data comprises sonar returns received by one or more sonar transducers of the watercraft, wherein the sonar returns are received from the underwater environment corresponding to a volume extending outwardly from the watercraft;
determine the location of the watercraft at an instance in which the sonar returns are received;
generate a sonar image from the sonar returns of the sonar data received by the one or more sonar transducers, wherein the sonar image is formed using sonar returns that were only received from the one or more transducers of the watercraft at the location and the instance in which the sonar returns were received;
determine a direction and a distance the sonar image extends from the watercraft when the sonar image would be positioned over a chart at a position corresponding to the location of the watercraft at the instance in which the sonar returns were received;
determine, based on the determined direction and distance, that the sonar image would extend over a boundary of the body of water, wherein the boundary corresponds to an edge of the body of water;
generate an updated sonar image based on the sonar image and the boundary of the body of the water such that no portion of the updated sonar image extends beyond the boundary, wherein at least a portion of the sonar image that would otherwise extend over the boundary is not present in the updated sonar image; and
cause display of the updated sonar image over the chart at the location such that the updated sonar image does not extend beyond the boundary as indicated by the chart.

2. The apparatus of claim 1, wherein the memory and the computer program code are further configured to, with the processor, cause the apparatus to generate the updated sonar image by:
determining a portion of the sonar image that extends beyond the boundary; and
removing the portion of the sonar image prior to causing display of the updated sonar image over the chart at the location.

3. The apparatus of claim 1, wherein the memory and the computer program code are further configured to, with the processor, cause the apparatus to generate the updated sonar image by:
comparing sonar image data based on the sonar data with one of a polyline or a polygon associated with the boundary; and
generating the updated sonar image without sonar image data that extends past the one of the polyline or the polygon.

4. The apparatus of claim 1, wherein the memory and the computer program code are further configured to, with the processor, cause the apparatus to:
determine a preset distance that corresponds to a desired distance from the watercraft that a user would like the sonar image to span; and
determine that the preset distance extends beyond the boundary.

5. The apparatus of claim 1, wherein the memory and the computer program code are further configured to, with the processor, cause the apparatus to filter the sonar data to remove sonar data that extends beyond the boundary.

6. The apparatus of claim 5, wherein the sonar returns each define a distance component in a plane defined leading from the watercraft to the boundary, wherein the memory and the computer program code are further configured to, with the processor, cause the apparatus to:
determine a boundary threshold distance in the plane leading from the watercraft to the boundary that corresponds to the distance from the watercraft to the boundary; and
filter the sonar data by removing each sonar return that defines a distance in the plane defined leading from the watercraft to the boundary that is greater than the boundary threshold distance.

7. The apparatus of claim 1, wherein the sonar data is current sonar data and the location is the current location, and wherein the memory and the computer program code are further configured to, with the processor, cause the apparatus to:
determine the boundary of the body of water proximate the current location in substantially real-time; and
generate the updated sonar image based on the current sonar data such that no portion of the updated sonar image extends beyond the boundary in substantially real-time.

8. The apparatus of claim 1, wherein the memory and the computer program code are further configured to, with the processor, cause the apparatus to determine the boundary by determining one or more locations of the body of water that define a zero depth such that the boundary is determined based on current depth data.

9. The apparatus of claim 1, wherein the memory and the computer program code are further configured to, with the processor, cause the apparatus to determine the boundary by determining a pre-stored boundary of the body of water.

10. The apparatus of claim 1, wherein the sonar data is 3D sonar data.

11. A system with the apparatus of claim 1, wherein the system further comprises:
a transducer assembly comprised of the one or more sonar transducers, wherein the transducer assembly is configured to be affixed to the watercraft and is electrically connected to the apparatus; and
a display device electrically connected to the apparatus and configured to display the updated sonar image over the chart.

12. A method comprising:
receiving sonar data associated with an underwater environment relative to a watercraft at a location of a body of water, wherein the sonar data comprises sonar returns received by one or more sonar transducers of the watercraft, wherein the sonar returns are received from the underwater environment corresponding to a volume extending outwardly from the watercraft;
determining, by a processor, the location of the watercraft at an instance in which the sonar returns are received;

generating a sonar image from the sonar returns of the sonar data received by the one or more sonar transducers, wherein the sonar image is formed using sonar returns that were only received from the one or more transducers of the watercraft at the location and the instance in which the sonar returns were received;

determining a direction and a distance the sonar image extends from the watercraft when the sonar image would be positioned over a chart at a position corresponding to the location of the watercraft at the instance in which the sonar returns were received;

determining, based on the determined direction and distance, that the sonar image would extend over a boundary of the body of water, wherein the boundary corresponds to an edge of the body of water;

generating an updated sonar image based on the sonar image and the boundary of the body of the water such that no portion of the updated sonar image extends beyond the boundary, wherein at least a portion of the sonar image that would otherwise extend over the boundary is not present in the updated sonar image; and causing display of the updated sonar image over the chart at the location such that the updated sonar image does not extend beyond the boundary as indicated by the chart.

13. The method of claim 12, wherein generating the updated sonar image comprises:
   determining a portion of the sonar image that extends beyond the boundary; and
   removing the portion of the sonar image prior to causing display of the updated sonar image over the chart at the location.

14. The method of claim 12, wherein generating the updated sonar image comprises:
   comparing sonar image data based on the sonar data with one of a polyline or a polygon associated with the boundary; and
   generating the updated sonar image without sonar image data that extends past the one of the polyline or the polygon.

15. The method of claim 12 further comprising:
   determining a preset distance that corresponds to a desired distance from the watercraft that a user would like the sonar image to span; and
   determining that the preset distance extends beyond the boundary.

16. The method of claim 12 further comprising filtering the sonar data to remove sonar data that extends beyond the boundary.

17. A non-transitory computer-readable medium comprised of at least one memory device having computer program instructions stored thereon, the computer program instructions being configured, when run by a processor, to:
   receive sonar data associated with an underwater environment relative to a watercraft at a location of a body of water, wherein the sonar data comprises sonar returns received by one or more sonar transducers of the watercraft, wherein the sonar returns are received from the underwater environment corresponding to a volume extending outwardly from the watercraft;
   determine the location of the watercraft at an instance in which the sonar returns are received;
   generate a sonar image from the sonar returns of the sonar data received by the one or more sonar transducers, wherein the sonar image is formed using sonar returns that were only received from the one or more transducers of the watercraft at the location and the instance in which the sonar returns were received;
   determine a direction and a distance the sonar image extends from the watercraft when the sonar image would be positioned over a chart at a position corresponding to the location of the watercraft at the instance in which the sonar returns were received;
   determine, based on the determined direction and distance, that the sonar image would extend over a boundary of the body of water, wherein the boundary corresponds to an edge of the body of water;
   generate an updated sonar image based on the sonar image and the boundary of the body of the water such that no portion of the updated sonar image extends beyond the boundary, wherein at least a portion of the sonar image that would otherwise extend over the boundary is not present in the updated sonar image; and
   cause display of the updated sonar image over the chart at the location such that the updated sonar image does not extend beyond the boundary as indicated by the chart.

18. The computer-readable medium of claim 17, wherein the computer program instructions are further configured, when run by the processor, to generate the updated sonar image by:
   determining a portion of the sonar image that extends beyond the boundary; and
   removing the portion of the sonar image prior to causing display of the updated sonar image over the chart at the location.

19. The computer-readable medium of claim 17, wherein the computer program instructions are further configured, when run by the processor, to generate the updated sonar image by:
   comparing sonar image data based on the sonar data with one of a polyline or a polygon associated with the boundary; and
   generating the updated sonar image without sonar image data that extends past the one of the polyline or the polygon.

20. The computer-readable medium of claim 17, wherein the computer program instructions are further configured, when run by the processor, to filter the sonar data to remove sonar data that extends beyond the boundary.

* * * * *